(12) United States Patent
Hwang et al.

(10) Patent No.: US 10,547,427 B2
(45) Date of Patent: Jan. 28, 2020

(54) METHOD FOR TRANSMITTING DEMODULATION REFERENCE SIGNAL IN WIRELESS COMMUNICATION SYSTEM THAT SUPPORTS NARROW BAND IOT AND APPARATUS FOR SUPPORTING THE SAME

(71) Applicant: LG ELECTRONICS INC., Seoul (KR)

(72) Inventors: Seunggye Hwang, Seoul (KR); Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 15/390,030

(22) Filed: Dec. 23, 2016

(65) Prior Publication Data

US 2017/0187499 A1 Jun. 29, 2017

Related U.S. Application Data

(60) Provisional application No. 62/387,600, filed on Dec. 24, 2015.

(51) Int. Cl.
*H04L 5/00* (2006.01)

(52) U.S. Cl.
CPC .................................. *H04L 5/0051* (2013.01)

(58) Field of Classification Search
CPC ............. H04L 5/005; H04W 72/0446; H04W 72/0453

USPC ........................................................ 370/339
See application file for complete search history.

(56) References Cited

U.S. PATENT DOCUMENTS

| 2013/0287064 | A1* | 10/2013 | Seo .................... H04J 13/18 375/144 |
| 2014/0286255 | A1* | 9/2014 | Nam .................... H04L 1/1861 370/329 |
| 2017/0180095 | A1* | 6/2017 | Xue .................... H04L 5/0048 |
| 2017/0230135 | A1* | 8/2017 | Oh .................... H04L 1/001 |
| 2018/0006786 | A1* | 1/2018 | Guo .................... H04L 5/0048 |
| 2018/0206253 | A1* | 7/2018 | Yun .................... H04L 5/0062 |

* cited by examiner

*Primary Examiner* — Huy D Vu
*Assistant Examiner* — Nizam U Ahmed
(74) *Attorney, Agent, or Firm* — Lee Hong Degerman Kang Waimey

(57) ABSTRACT

According to an aspect of the present invention, a method for transmitting a Demodulation Reference Signal (DMRS) performed by a terminal in a wireless communication system that supports a Narrow Band (NB)-Internet of Things (IoT) includes generating a DMRS sequence by considering a single subcarrier transmission or a multiple subcarrier transmission; mapping the generated DMRS sequence to one or more symbols in time domain; and transmitting the DMRS to a base station through the mapped symbols, where each element of the generated DMRS sequence is sequentially mapped to each symbol of M symbols, when the DMRS is transmitted through the single subcarrier, and where the generated DMRS sequence is mapped to N symbols, when the DMRS is transmitted through the multiple subcarriers.

11 Claims, 23 Drawing Sheets

(a) In-band system (b) Guard-band system (c) Stand-alone system

US 10,547,427 B2

METHOD FOR TRANSMITTING DEMODULATION REFERENCE SIGNAL IN WIRELESS COMMUNICATION SYSTEM THAT SUPPORTS NARROW BAND IOT AND APPARATUS FOR SUPPORTING THE SAME

CROSS-REFERENCE TO RELATED APPLICATIONS

Pursuant to 35 U.S.C. § 119(e), this application claims the benefit of U.S. Provisional Application No. 62/387,600 filed on Dec. 24, 2015, the contents of which are hereby incorporated by reference herein in its entirety.

BACKGROUND OF THE INVENTION

Field of the Invention

The present invention relates to wireless communication systems, and more particularly, to a method for transmitting a modulation reference signal in a wireless communication system that supports the narrow band IoT and an apparatus for the same.

Discussion of the Related Art

The mobile communication system is developed to provide the voice service while guaranteeing the activity of a user. However, the mobile communication system is extended to the data service in addition to the voice service. Currently, since the shortage of resource is caused owing to the explosive traffic increase and users requires higher services, more developed mobile communication system is needed.

The requirement for the next mobile communication system should support the acceptance of explosive data traffic increase, the innovative increase of transmission rate per user, the acceptance of the number of connection devices which are dramatically increased, very low End-to-End Latency, high energy efficiency. To this end, various techniques have been researched such as the Dual Connectivity, the Massive Multiple Input Multiple Output (Massive MIMO), the In-band Full Duplex, the Non-Orthogonal Multiple Access (NOMA), the Super wideband support, the Device Networking, and so on.

SUMMARY OF THE INVENTION

An object of the present disclosure is to provide a method for constructing or configuring a DMRS considering a single subcarrier transmission or multiple subcarrier transmission in the NB-IoT system.

In addition, another object of the present disclosure is to provide a method for generating and mapping a DMRS sequence when performing a single subcarrier transmission in the NB-IoT system.

In addition, yet another object of the present disclosure is to provide a method for generating and mapping a DMRS sequence when performing multiple subcarrier transmission in the NB-IoT system.

In addition, still another object of the present disclosure is to provide a method for applying a cover code and/or a frequency hopping to a DMRS in the NB-IoT system.

The technical objects to attain in the present invention are not limited to the above-described technical objects and other technical objects which are not described herein will become apparent to those skilled in the art from the following description.

According to an aspect of the present invention, a method for transmitting a Demodulation Reference Signal (DMRS) performed by a terminal in a wireless communication system that supports a Narrow Band (NB)-Internet of Things (IoT) includes generating a DMRS sequence by considering a single subcarrier transmission or a multiple subcarrier transmission; mapping the generated DMRS sequence to one or more symbols in time domain; and transmitting the DMRS to a base station through the mapped symbols, where each element of the generated DMRS sequence is sequentially mapped to each symbol of M symbols, when the DMRS is transmitted through the single subcarrier, and where the generated DMRS sequence is mapped to N symbols, when the DMRS is transmitted through the multiple subcarriers.

In addition, a length of the generated DMRS sequence is same as a number of multiple subcarriers, when the DMRS is transmitted through the multiple subcarriers.

In addition, a number of the generated DMRS sequence is 3, when the number of multiple subcarriers is 3.

In addition, a subcarrier spacing of the single subcarrier is 3.75 kHz or 15 kHz.

In addition, each symbol of M symbols and each symbol of N symbols is a specific symbol in a time unit.

In addition, the specific symbol is a fourth symbol in the time unit, when subcarrier spacing of the single subcarrier transmission is 15 kHz.

In addition, the DMRS is transmitted through a narrowband that has a bandwidth smaller than 200 kHz.

In addition, the DMRS sequence is determined based on a cell-ID.

In addition, an orthogonal cover code or a non-orthogonal cover code is applied to the generated DMRS sequence, when the DMRS is transmitted through the single subcarrier.

In addition, a frequency hopping that has a hopping interval based on a cell-ID is applied, when the DMRS is transmitted through the single subcarrier.

In addition, the time unit is a slot.

According to another aspect of the present invention, a terminal transmitting a Demodulation Reference Signal (DMRS) in a wireless communication system that supports a Narrow Band (NB)-Internet of Things (IoT) includes a radio frequency (RF) unit for transmitting and receiving a radio signal; and a processor for controlling the RF unit, where the processor is configured to perform generating a DMRS sequence by considering a single subcarrier transmission or a multiple subcarrier transmission; mapping the generated DMRS sequence to one or more symbols in time domain; and transmitting the DMRS to a base station through the mapped symbols, where each element of the generated DMRS sequence is sequentially mapped to each symbol of M symbols, when the DMRS is transmitted through the single subcarrier, and where the generated DMRS sequence is mapped to N symbols, when the DMRS is transmitted through the multiple subcarriers.

BRIEF DESCRIPTION OF THE DRAWINGS

The accompanying drawings, which are included herein as a part of the description for help understanding the present invention, provide embodiments of the present invention, and describe the technical features of the present invention with the description below.

DETAIL DESCRIPTION OF THE INVENTION

Figure 1:
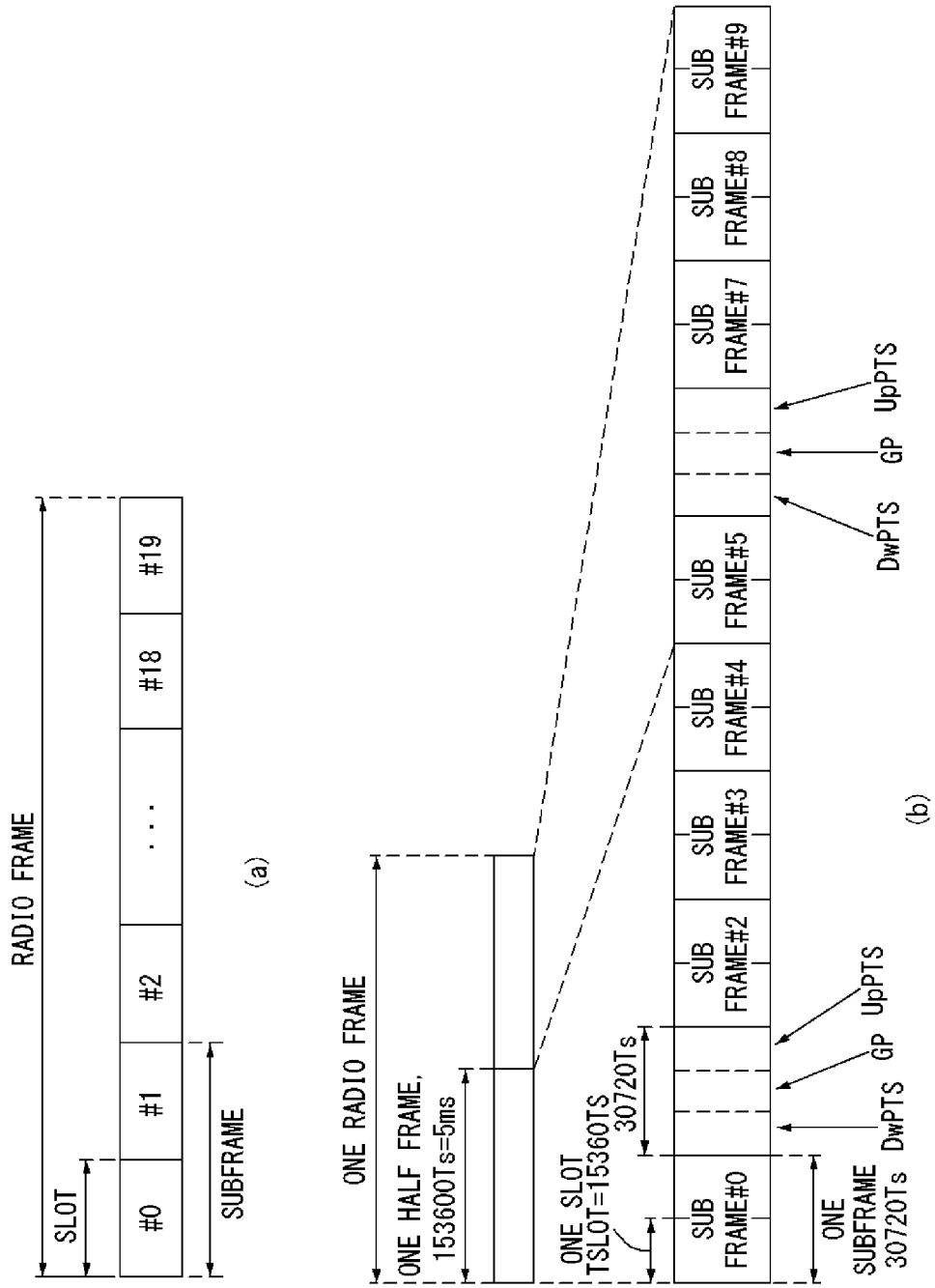
FIG. 1 illustrates the structure of a radio frame in a wireless communication system to which the present invention may be applied.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe in a radio frame, 'D' represents a subframe for a downlink transmission, 'U' represent a subframe for an uplink transmission, 'S' represents a special subframe that includes three types, a Downlink Pilot Time Slot (DwPTS), a Guard Period (GP) and an Uplink Pilot Time Slot (UpPTS).

The DwPTS is used for an initial cell search, synchronization or channel estimation in a terminal. The UpPTS is used for the channel estimation in a BS and synchronizing an uplink transmission synchronization of a terminal. The GP is a period for removing interference occurred in uplink owing to multi-path latency of a downlink signal between uplink and downlink.

Each subframe i includes slot 2i and slot 2i+1 of $T\_slot=15360*T\_s=0.5$ ms length.

There are seven types of uplink-downlink configurations and the position and/or number of downlink subframe, special subframe and uplink subframe are different for each configuration.

The time switched from downlink to uplink or the time switched from uplink to downlink is referred to as a switching point. The periodicity of the switching point means a period in which the phenomenon of unlink subframe and downlink subframe being switched is repeated in the same pattern, and both 5 ms and 10 ms are supported. In the case of a period of 5 ms downlink-uplink switching point, the special subframe(s) is existed in every half-frame, and in the case of a period of 10 ms downlink-uplink switching point, the special subframe(s) is existed in the first half-frame only.

For all configurations, 0th, fifth subframes and the DwPTS are durations only for a downlink transmission. The subframe directly following the UpPTS and subframe are durations for an uplink transmission always.

Such an uplink-downlink configuration is the system information, and may be known to a BS and a terminal. A BS may notify the change of the uplink-downlink allocation state of a radio frame by transmitting an index of configuration information only whenever the uplink-downlink configuration information is changed. In addition, the configuration information is a sort of downlink control information and may be transmitted through a Physical Downlink Control Channel (PDCCH) like other scheduling information, or it is the broadcast information and may be commonly transmitted to all terminals in a cell through a broadcast channel.

Table 2 represents a configuration (lengths of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

The radio frame structure according to an example of FIG. 1 is just an example, but the number of subcarriers included in a radio frame, the number of slots included in a subframe or the number of OFDM symbols included in a slot may be changed in various manners.

Figure 2:
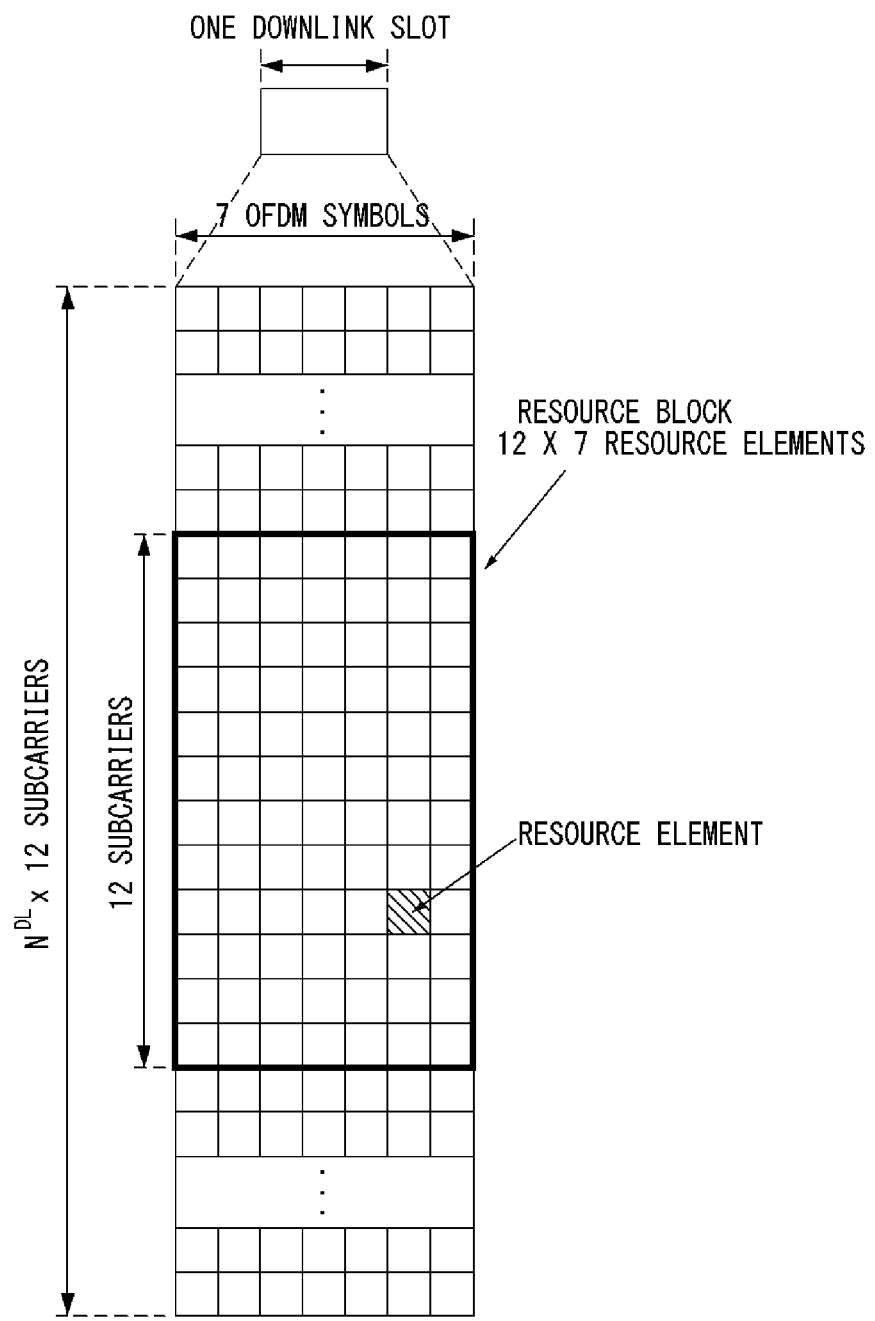
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
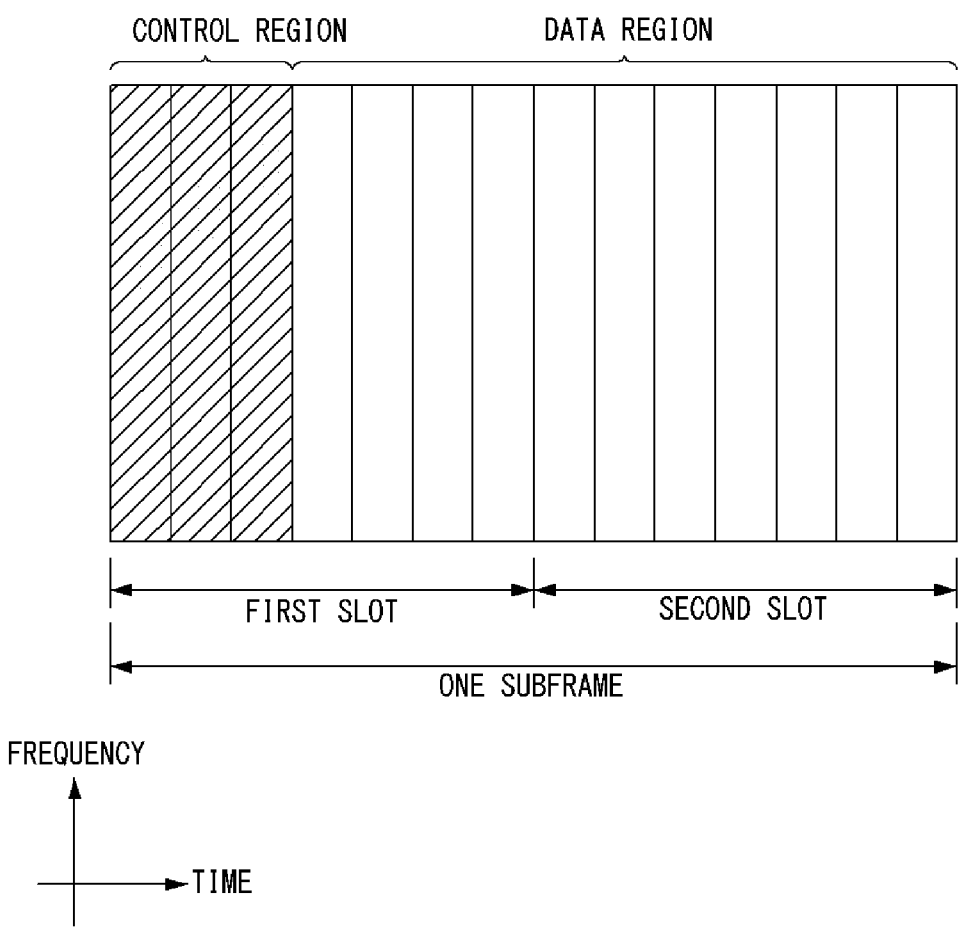
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
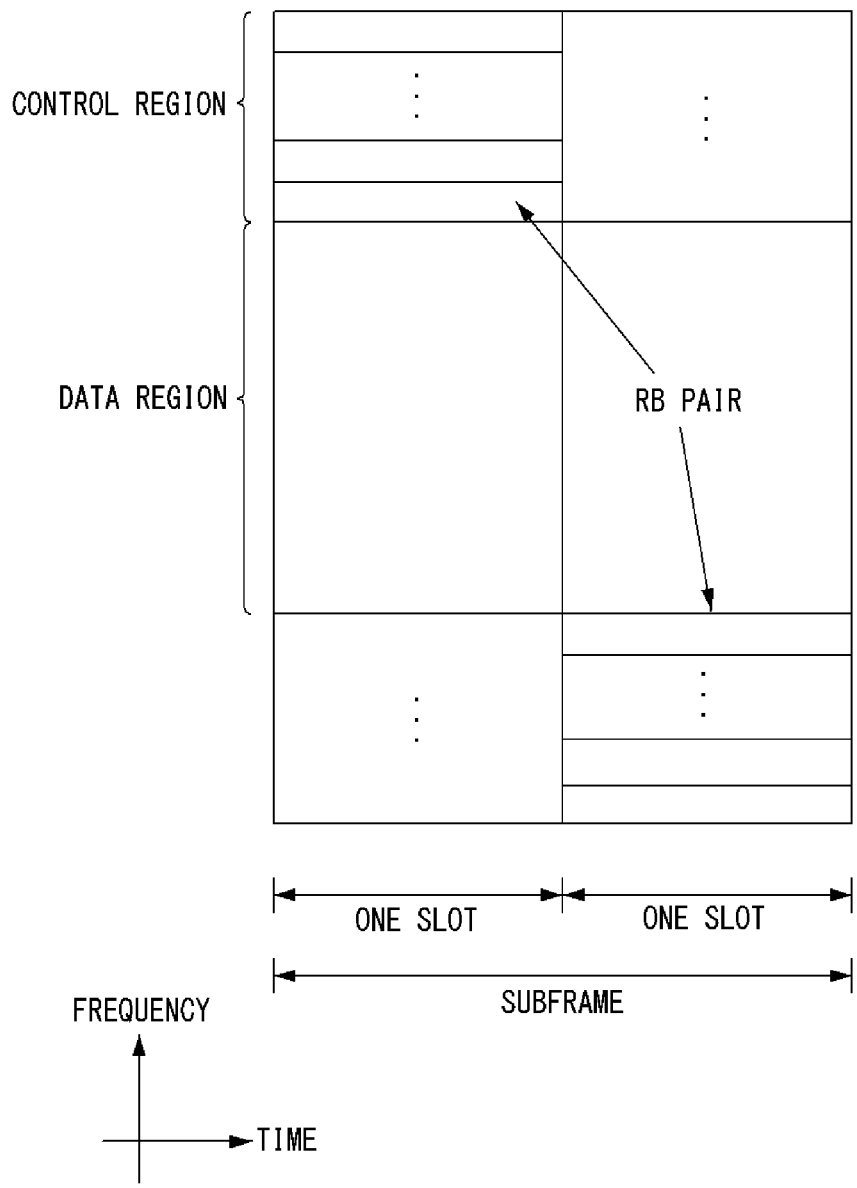
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

Figure 5:
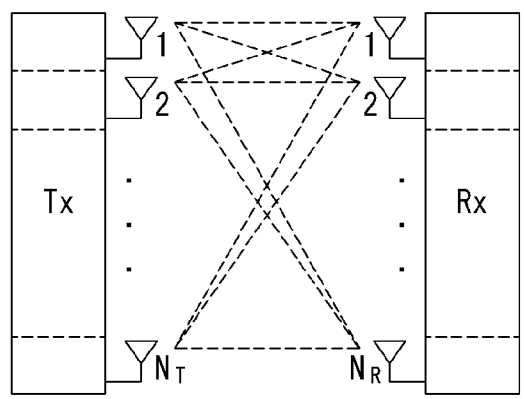
FIG. 5 illustrates the configuration of a known MIMO communication system.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$S = [s_1, s_2, \ldots, s_{N_T}]^T \qquad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \quad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, fro example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y=[y_1,y_2,\ldots,y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 6:
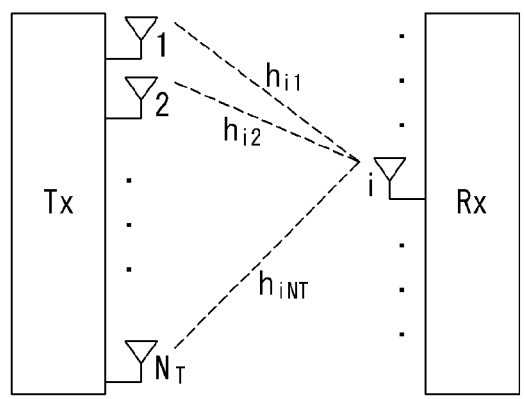
FIG. 6 is a diagram showing a channel from a plurality of transmission antennas to a single reception antenna.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T=[h_{i1},h_{i2},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n=[n_1,n_2,\ldots,n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \le \min(N_T,N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 7:
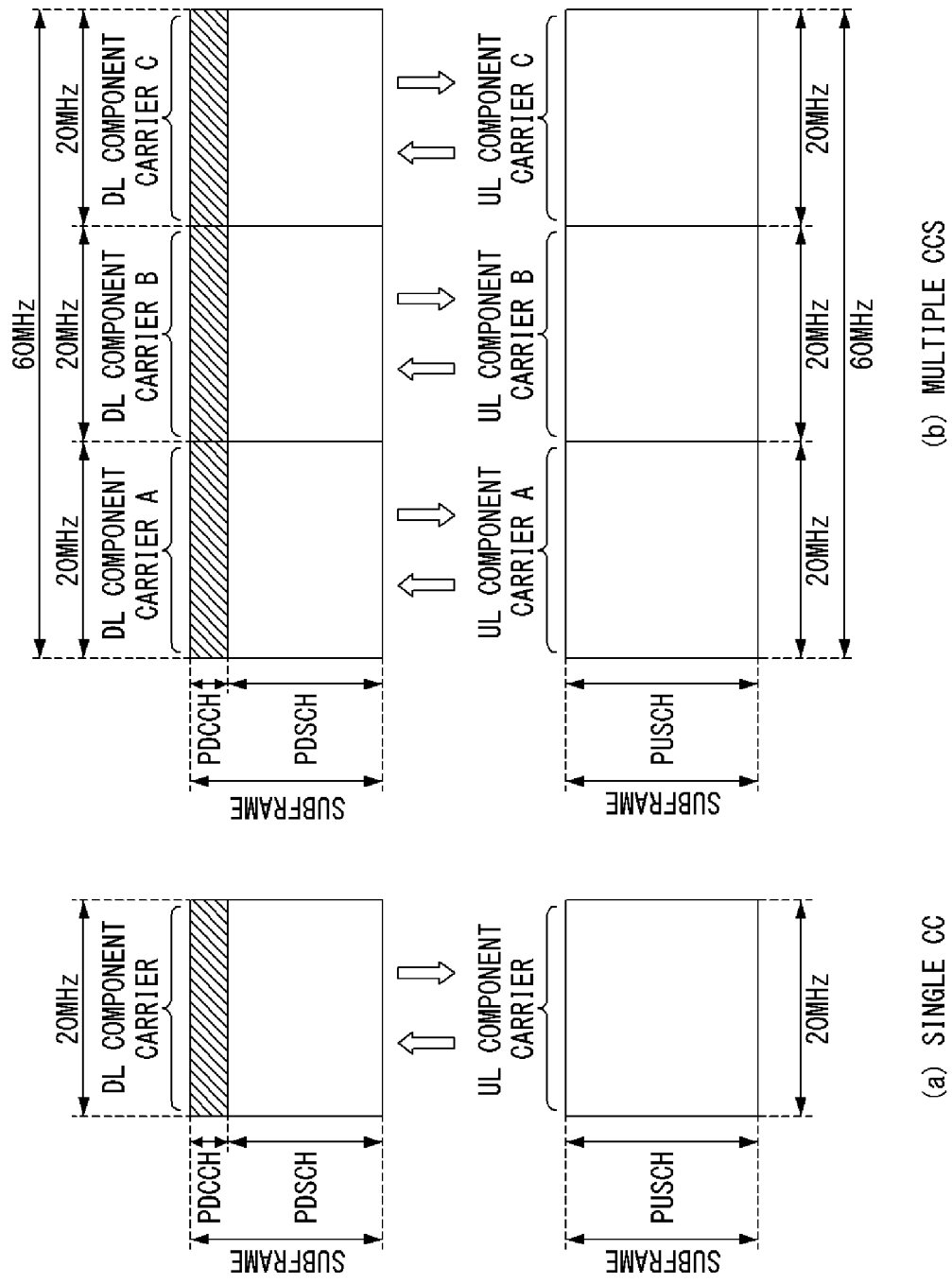
FIG. 7 illustrates an example of component carriers and a carrier aggregation in a wireless communication system to which an embodiment of the present invention may be applied.

FIG. 7 illustrates examples of a component carrier and carrier aggregation in the wireless communication system to which the present invention can be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Figure 8:
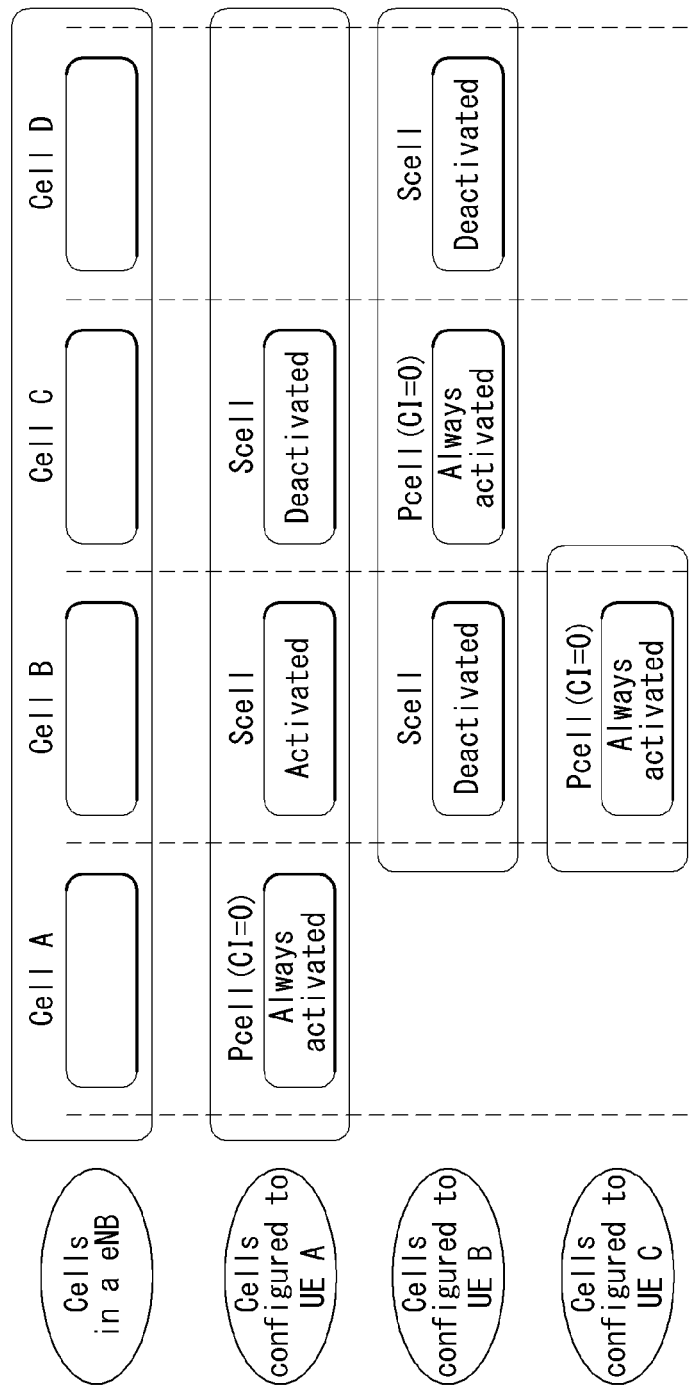
FIG. 8 is a diagram illustrating a cell classification in a system that supports the carrier aggregation.

FIG. 8 is a diagram illustrating a cell classification in a system that supports the carrier aggregation.

Referring to FIG. 8, a configured cell is a cell that should be carrier-merged based on a measurement report among the cells of a BS as shown in FIG. 7, may be configured for each terminal. The configured cell may reserve a resource for an ACK/NACK transmission for a PDSCH transmission beforehand. An activated cell is a cell that is configured to transmit PDSCH/PUSCH actually among the configured cells, and performs a Channel State Information (CSI) report for the PDSCH/PUSCH transmission and a Sounding Reference Signal (SRS) transmission. A de-activated cell is a cell that does not transmit the PDSCH/PUSCH transmission by a command of BS or a timer operation, may also stop the CSI report and the SRS transmission.

Synchronization Signal/Sequence (SS)

An SS includes a primary (P)-SS and a secondary (S)-SS, and corresponds to a signal used when a cell search is performed.

Figure 9:
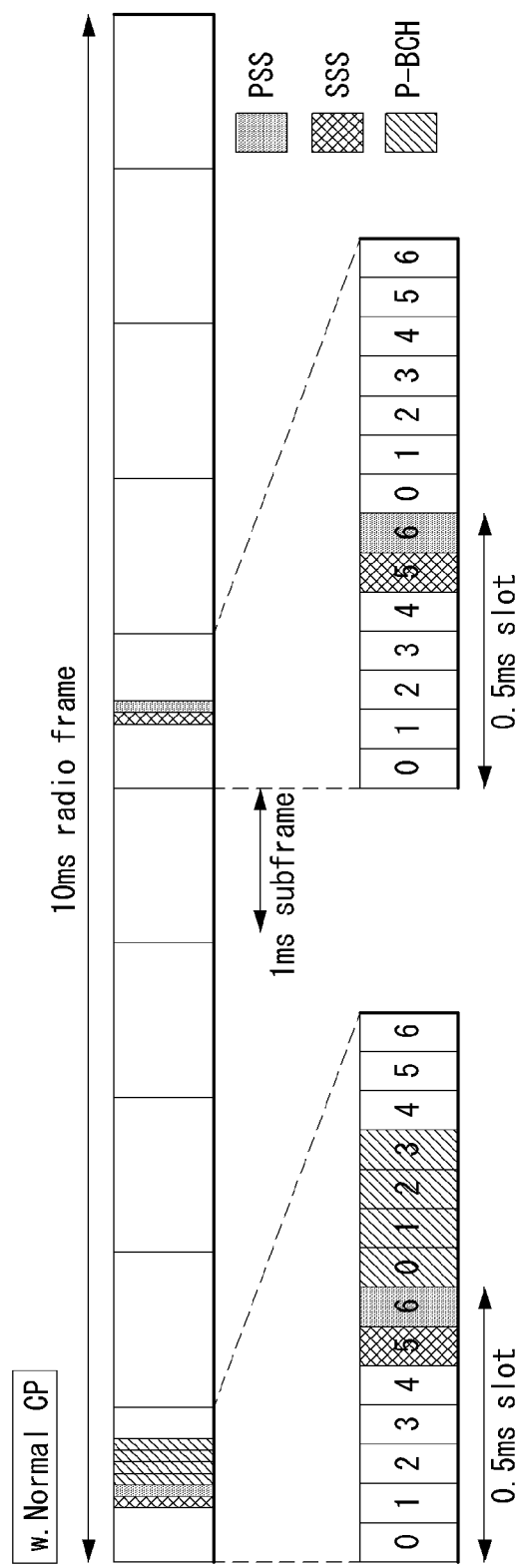
FIG. 9 is a diagram illustrating a frame structure used for an SS transmission in a system that uses a normal cyclic prefix (CP).
Figure 10:
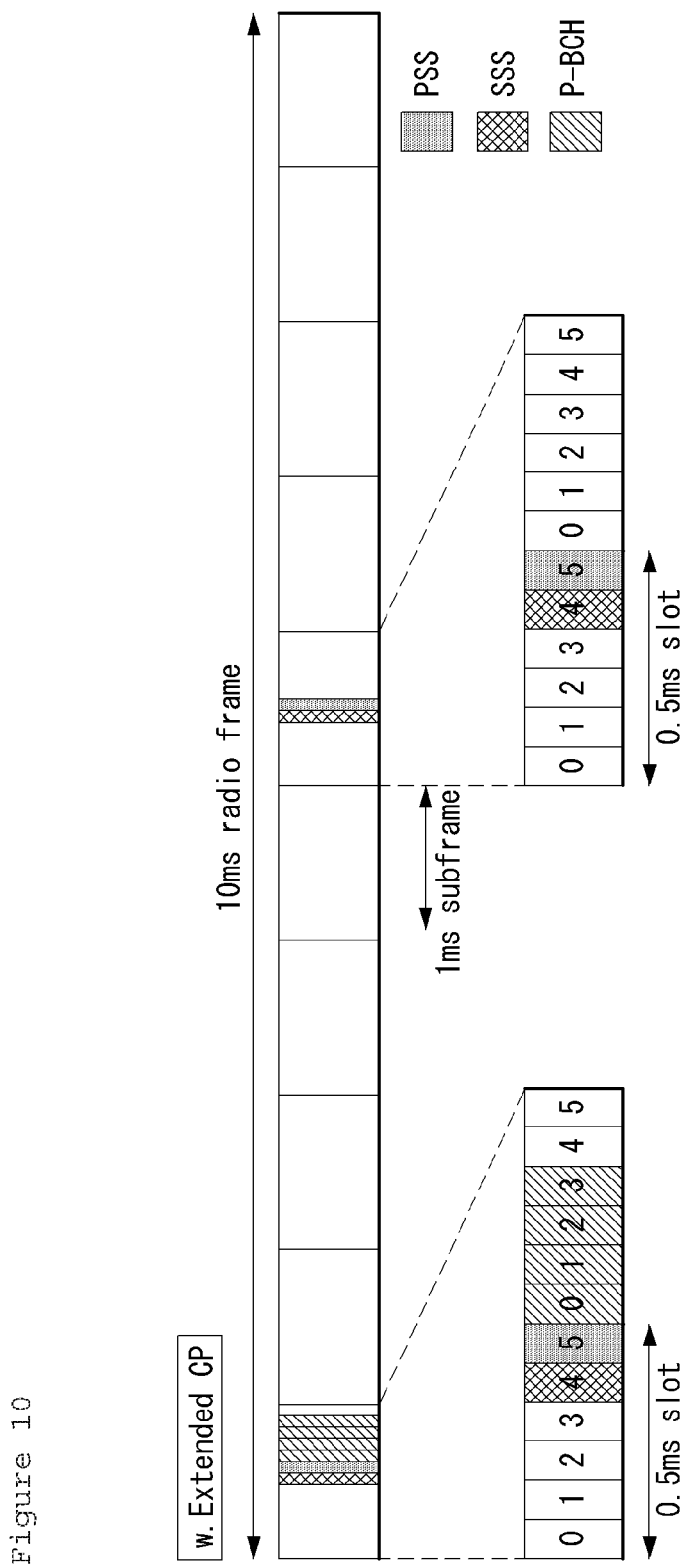
FIG. 10 is a diagram illustrating a frame structure used for an SS transmission in a system that uses an extended CP.

FIG. 9 is a diagram illustrating a frame structure used for an SS transmission in a system that uses a normal cyclic prefix (CP). FIG. 10 is a diagram illustrating a frame structure used for an SS transmission in a system that uses an extended CP.

The SS is transmitted in 0th subframe and second slot of the fifth subframe, respectively, considering 4.6 ms which is a Global System for Mobile communications (GSM) frame length for the easiness of an inter-Radio Access Technology (RAT) measurement, and a boundary for the corresponding radio frame may be detected through the S-SS. The P-SS is transmitted in the last OFDM symbol of the corresponding slot and the S-SS is transmitted in the previous OFDM symbol of the P-SS.

The SS may transmit total 504 physical cell IDs through the combination of 3 P-SSs and 168 S-SSs. In addition, the SS and the PBCH are transmitted within 6 RBs at the center of a system bandwidth such that a terminal may detect or decode them regardless of the transmission bandwidth.

A transmission diversity scheme of the SS is to use a single antenna port only and not separately used in a standard. That is, the transmission diversity scheme of the SS uses a single antenna transmission or a transmission technique transparent to a terminal (e.g., Precoder Vector Switching (PVS), Time-Switched Transmit Diversity (TSTD) and Cyclic-Delay Diversity (CDD)).

1. P-SS Sign

Zadoff-Chu (ZC) sequence of length 63 in frequency domain may be defined and used as a sequence of the P-SS. The ZC sequence is defined by Equation 12, a sequence element, n=31 that corresponds to a DC subcarrier is punctured. In Equation 12, N_zc=63.

$$d_u(n) = e^{-j\frac{\pi u n(n+1)}{N_{ZC}}}$$ [Equation 12]

Among 6 RBs (=7 subcarriers) positioned at the center of frequency domain, the remaining 9 subcarriers are always transmitted in zero value, which makes it easy to design a filter for performing synchronization. In order to define total three P-SSs, the value of u=29, 29 and 34 may be used in Equation 12. In this case, since 29 and 34 have the conjugate symmetry relation, two correlations may be simultaneously performed. Here, the conjugate symmetry means Equation 13. By using the characteristics, it is possible to implement one shot correlater for u=29 and 43, and accordingly, about 33.3% of total amount of calculation may be decreased.

$$d_u(n)=(-1)^n(d_{N_{ZC}-u}(n))^*, \text{ when } N_{ZC} \text{ is even number.}$$

$$d_u(n)=(d_{N_{ZC}-u}(n))^*, \text{ when } N_{ZC} \text{ is odd number.}$$ [Equation 13]

2. S-SS Sign

The sequence used for the S-SS is combined with two interleaved m-sequences of length 31, and 168 cell group IDs are transmitted by combining two sequences. The m-sequence as the SSS sequence is robust in the frequency selective environment, and may be transformed to the highspeed m-sequence using the Fast Hadamard Transform, thereby the amount of operations being decreased. In addition, the configuration of SSS using two short codes is proposed to decrease the amount of operations of terminal.

Figure 11:
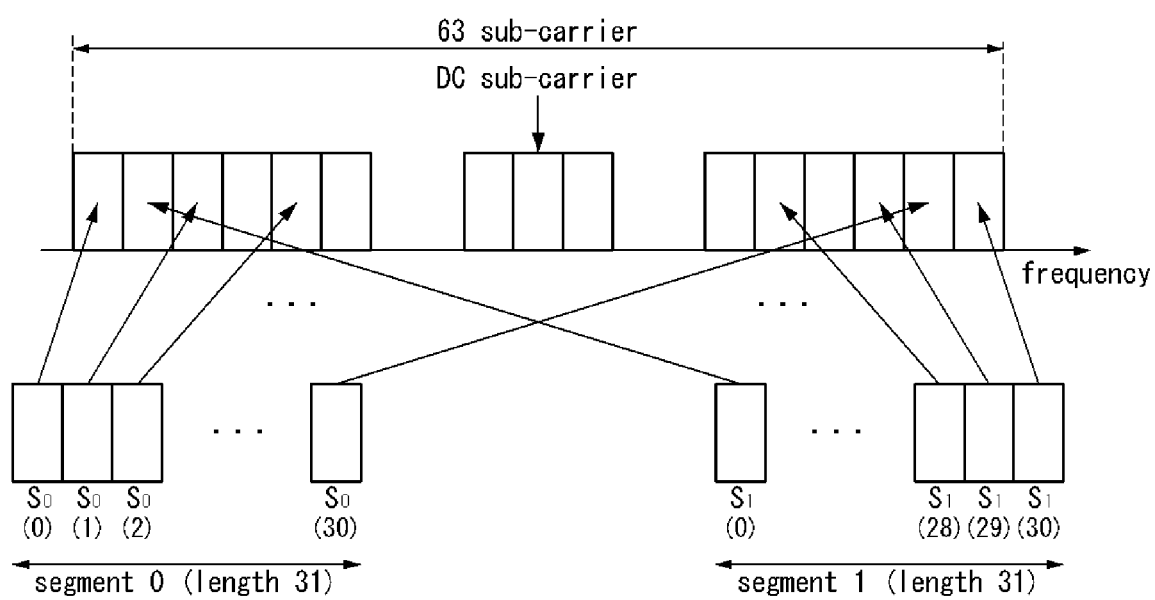
FIG. 11 is a diagram illustrating two sequences in a logical region being mapped to a physical region by being interleaved.

FIG. 11 is a diagram illustrating two sequences in a logical region being mapped to a physical region by being interleaved.

Referring to FIG. 11, when two m-sequences used for generating the S-SS sign are defined by S1 and S2, in the case that the S-SS (S1, S2) of subframe 0 transmits the cell group ID with the combination, the S-SS (S2, S1) of subframe 5 is transmitted with being swapped, thereby distinguishing the 10 ms frame boundary. In this case, the SSS sign uses the generation polynomial x5+x2+1, and total 31 signs may be generated through the circular shift.

In order to improve the reception performance, two different P-SS-based sequences are defined and scrambled to the S-SS, and scrambled to S1 and S2 with different sequences. Later, by defining the S1-based scrambling sign, the scrambling is performed to S2. In this case, the sign of S-SS is exchanged in a unit of 5 ms, but the P-SS-based scrambling sign is not exchanged. The P-SS-based scrambling sign is defined by six circular shift versions according to the P-SS index in the m-sequence generated from the generation polynomial x5+x2+1, and the S1-based scrambling sign is defined by eight circular shift versions according to the S1 index in the m-sequence generated from the generation polynomial x5+x4+x2+x1+1.

The contents below exemplify an asynchronous standard of the LTE system.

A terminal may monitor a downlink link quality based on a cell-specific reference signal in order to detect a downlink radio link quality of PCell.

A terminal may estimate a downlink radio link quality for the purpose of monitoring the downlink radio link quality of PCell, and may compare it with Q_out and Q_in, which are thresholds.

The threshold value Q_out may be defined as a level in which a downlink radio link is not certainly received, and may correspond to a block error rate 10% of a hypothetical PDCCH transmission considering a PCFICH together with transmission parameters.

The threshold value Q_in may be defined as a downlink radio link quality level, which may be great and more certainly received than Q_out, and may correspond to a block error rate 2% of a hypothetical PDCCH transmission considering a PCFICH together with transmission parameters.

Narrow Band (NB) LTE Cell Search

In the NB-LTE, although a cell search may follow the same rule as the LTE, there may be an appropriate modification in the sequence design in order to increase the cell search capability.

Figure 12:
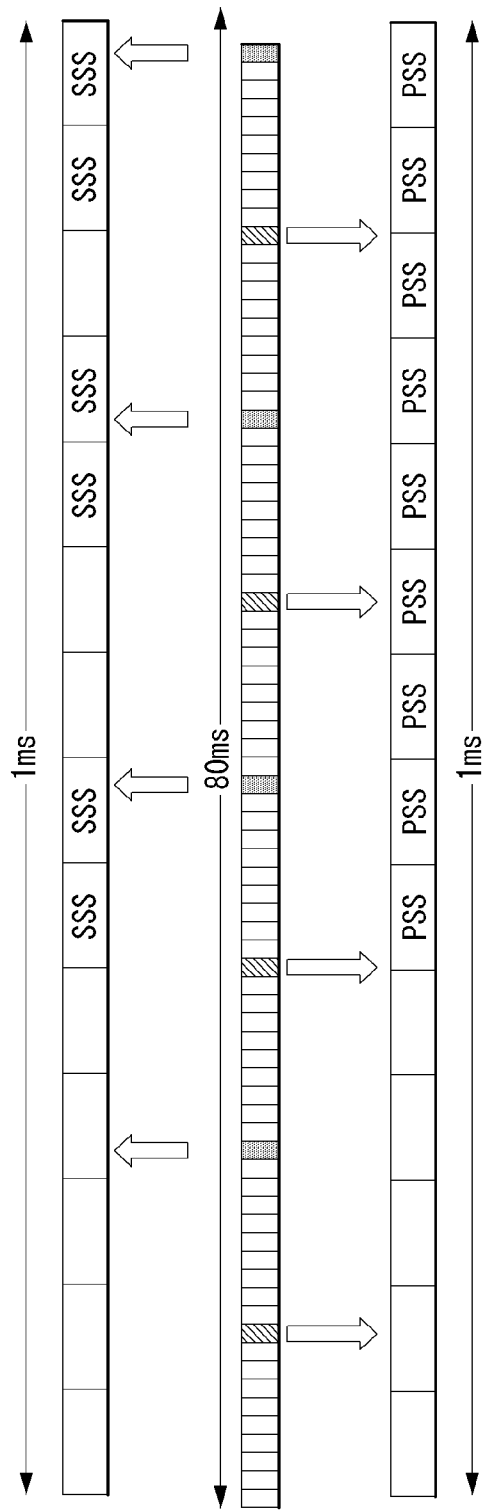
FIG. 12 is a diagram illustrating a frame structure to which M-PSS and M-SSS are mapped.

FIG. 12 is a diagram illustrating a frame structure to which M-PSS and M-SSS are mapped. In the present disclosure, an M-PSS designates the P-SS in the NB-LTE, and an M-SSS designates the S-SS in the NB-LTE. The M-PSS may also be designated to 'NB-PSS' and the M-SSS may also be designated to 'NB-SSS'.

Referring to FIG. 12, in the case of the M-PSS, a single primary synchronization sequence/signal may be used. (M-)PSS may be spanned up to 9 OFDM symbol lengths, and used for determining subframe timing as well as an accurate frequency offset.

This may be interpreted that a terminal may use the M-PSS for acquiring time and frequency synchronization with a BS. In this case, (M-)PSS may be consecutively located in time domain.

The M-SSS may be spanned up to 6 OFDM symbol lengths, and used for determining the timing of a cell identifier and an M-frame. This may be interpreted that a terminal may use the M-SSS for detecting an identifier of a BS. In order to support the same number as the number of cell identifier groups of the LTE, 504 different (M-)SSS may be designed.

Referring to the design of FIG. 12, the M-PSS and the M-SSS are repeated every 20 ms average, and existed/generated four times in a block of 80 ms. In the subframes that include synchronization sequences, the M-PSS occupies the last 9 OFDM symbols. The M-SSS occupies 6th, 7th, 10th, 11th, 13th and 14th OFDM symbols in the case of normal CP, and occupies 5th, 6th, 9th, 11th and 12th OFDM symbols in the case of extended CP.

The 9 OFDM symbols occupied by the M-PSS may be selected to support for the in-band disposition between LTE carriers. This is because the first three OFDM symbols are used to carry a PDCCH in the hosting LTE system and a subframe includes minimum twelve OFDM symbols (in the case of extended CP).

In the hosting LTE system, a cell-specific reference signal (CRS) is transmitted, and the resource elements that correspond to the M-PSS may be punctured in order to avoid a collision. In the NB-LTE, a specific position of M-PSS/M-SSS may be determined to avoid a collision with many legacy LTE signals such as the PDCCH, the PCFICH, the PHICH and/or the MBSFN.

In comparison with the LTE, the synchronization sequence design in the NB-LTE may be different.

This may be performed in order to attain a compromise between decreased memory consumption and faster synchronization in a terminal. Since the M-SSS is repeated four times in 80 ms duration, a slight design modification for the M-SSS may be required in the 80 ms duration in order to solve a timing uncertainty.

Structure of M-PSS and M-SSS

In the LTE, the PSS structure allows the low complexity design of timing and frequency offset measuring instrument, and the SSS is designed to acquire frame timing and to support unique 504 cell identifiers.

In the case of In-band and Guard-band of the LTE, the disposition of CP in the NB-LTE may be selected to match the CP in a hosting system. In the case of standalone, the extended CP may be used for matching a transmitter pulse shape for exerting the minimum damage to the hosting system (e.g., GSM).

A single M-PSS may be clearly stated in the N-LTE of the LTE. In the procedure of PSS synchronization of the LTE, for each of PSSs, a specific number of frequency speculations may be used for the coarse estimation of symbol timing and frequency offset.

Such an adaption of the procedure in the NB-LTE may increase the process complexity of a receiver according to the use of a plurality of frequency assumptions. In order to solve the problem, a sequence resembling of the Zadoff-Chu sequence which is differentially decoded in time domain may be proposed for the M-PSS. Since the differential decoding is performed in a transmission process, the differential decoding may be performed during the processing time of a receiver. Consequently, a frequency offset may be transformed from the consecutive rotation for symbols to the fixed phase offset with respect to the corresponding symbols.

Figure 13:
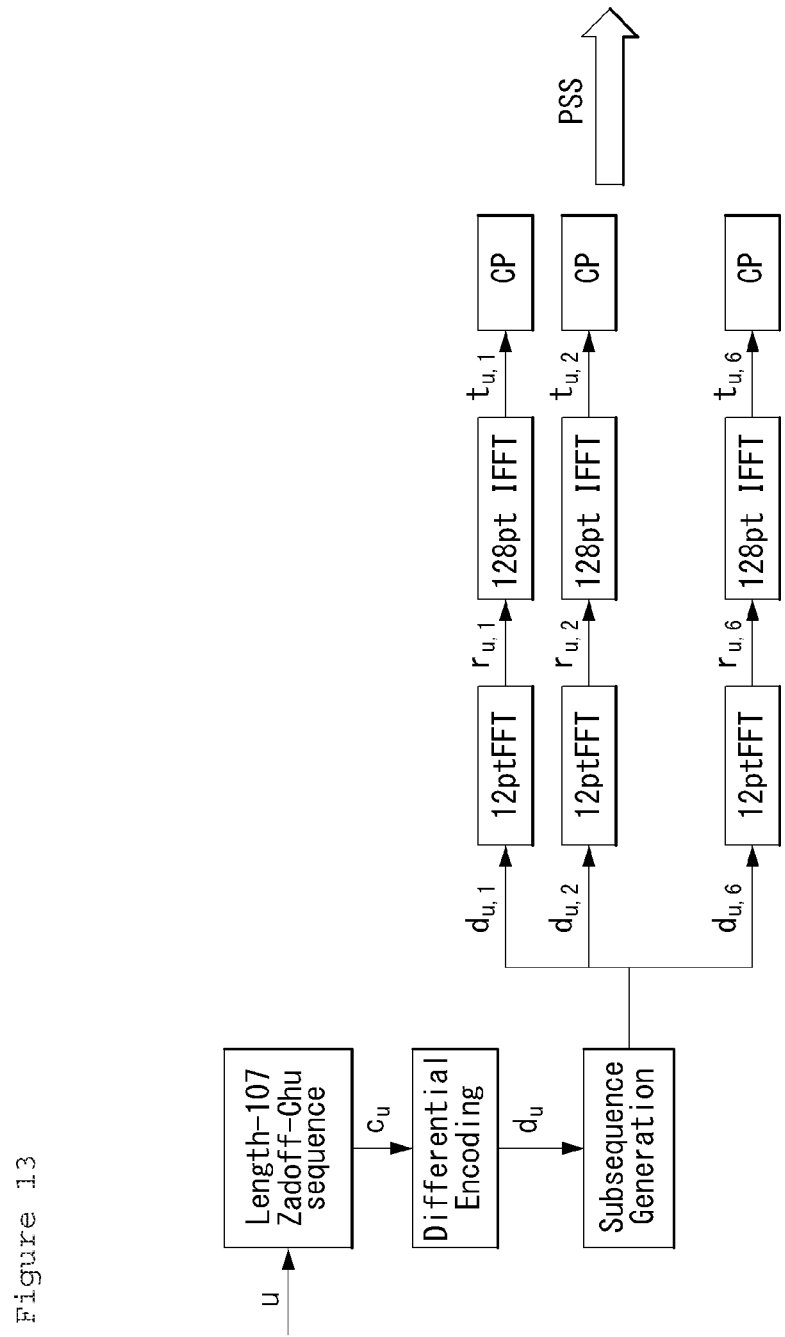
FIG. 13 is a diagram illustrating a method for generating M-PSS according to an embodiment of the present invention.

FIG. 13 is a diagram illustrating a method for generating M-PSS according to an embodiment of the present invention.

Referring to FIG. 13, first, when starting with a basic sequence of length 107 as a basis in order to generate an M-PSS, Equation 14 below may be obtained.

$$c(n) = e^{-\frac{j\pi un(n+1)}{N}}, n = \{0, 1, 2, \ldots, 106\} \quad \text{[Equation 14]}$$

The basic sequence c(n) may be differentially decoded in order to obtain d(n) sequence as represented in Equation 15.

$$d(n+1)=d(n)c(n), n=\{0,1,2,\ldots,106\}, d(0)=1, \quad \text{[Equation 15]}$$

The d(n) sequence is divided into 9 sub sequences, and each sub sequence has a length 12 and a sampling rate of 130 kHz. The 120-point FFT is performed for each of 9 sub sequences, and each sequence may be oversampled 128/12 times up to 1.92 MHz sampling rate using 128 IFFT zero padding. Consequently, each sub sequence may be mapped to 12 subcarriers for 9 OFDM symbols, respectively.

Each of the sub sequences is mapped to a single OFDM symbol, and the M-PSS may occupy total 9 OFDM symbols since total 9 sub sequences are existed. Total length of the M-PSS may be 1234(=(128+9)*9+1) when the normal CP of 9 samples are used, and may be 1440 when the extended CP is used.

The M-PSS which is going to be actually used during the transmission is not required to be generated every time using complex procedure in a transmitter/receiver in the same manner. The complexity coefficient (i.e., t_u(n)) that corresponds to the M-PSS may be generated in offline, and directly stored in the transmitter/receiver. In addition, even in the case that the M-PSS is generated in 1.92 MHz, the occupation bandwidth may be 180 kHz.

Accordingly, in the case of performing the procedure related to time and frequency offset measurements using the M-PSS in a receiver, the sampling rate of 192 kHz may be used for all cases. This may significantly decrease the complexity of receiver in the cell search.

In comparison with the LTE, the frequency in which the M-PSS is generated in the NB-LTE causes slightly greater overhead than the PSS in the LTE. More particularly, the synchronization sequence used in the LTE occupies 2.86% of the entire transmission resources, and the synchronization sequence used in the NB-LTE occupies about 5.36% of the entire transmission resources. Such an additional overhead has an effect of decreasing memory consumption as well as the synchronization time that leads to the improved battery life and the lower device price.

The M-SSS is designed in frequency domain and occupies 12 subcarriers in each of 6 OFDM symbols. Accordingly, the number of resource elements dedicated to the M-SSS may be 72. The M-SSS includes the ZC sequence of a single length 61 which are padded by eleven '0's on the starting point.

In the case of the extended CP, the first 12 symbols of the M-SSS may be discarded, and the remaining symbols may be mapped to the valid OFDM symbols, which cause to discard only a single symbol among the sequence of length 61 since eleven '0's are existed on the starting point. The discard of the symbol causes the slight degradation of the correlation property of other SSS.

The cyclic shift of a sequence and the sequence for different roots may easily provide specific cell identifiers up to 504. The reason why the ZC sequence is used in the NB-LTE in comparison with the LTE is to decrease the error detection rate. Since a common sequence for two different cell identifier groups is existed, an additional procedure is required in the LTE.

Since the M-PSS/M-SSS occur four times within the block of 80 ms, the LTE design of the SSS cannot be used for providing accurate timing information within the corresponding block. This is because the special interleaving structure that may determine only two positions. Accordingly, a scrambling sequence may be used in an upper part of the ZC sequence in order to provide the information of frame timing. Four scrambling sequences may be required to determine four positions within the block of 80 ms, which may influence on acquiring the accurate timing.

Figure 14:
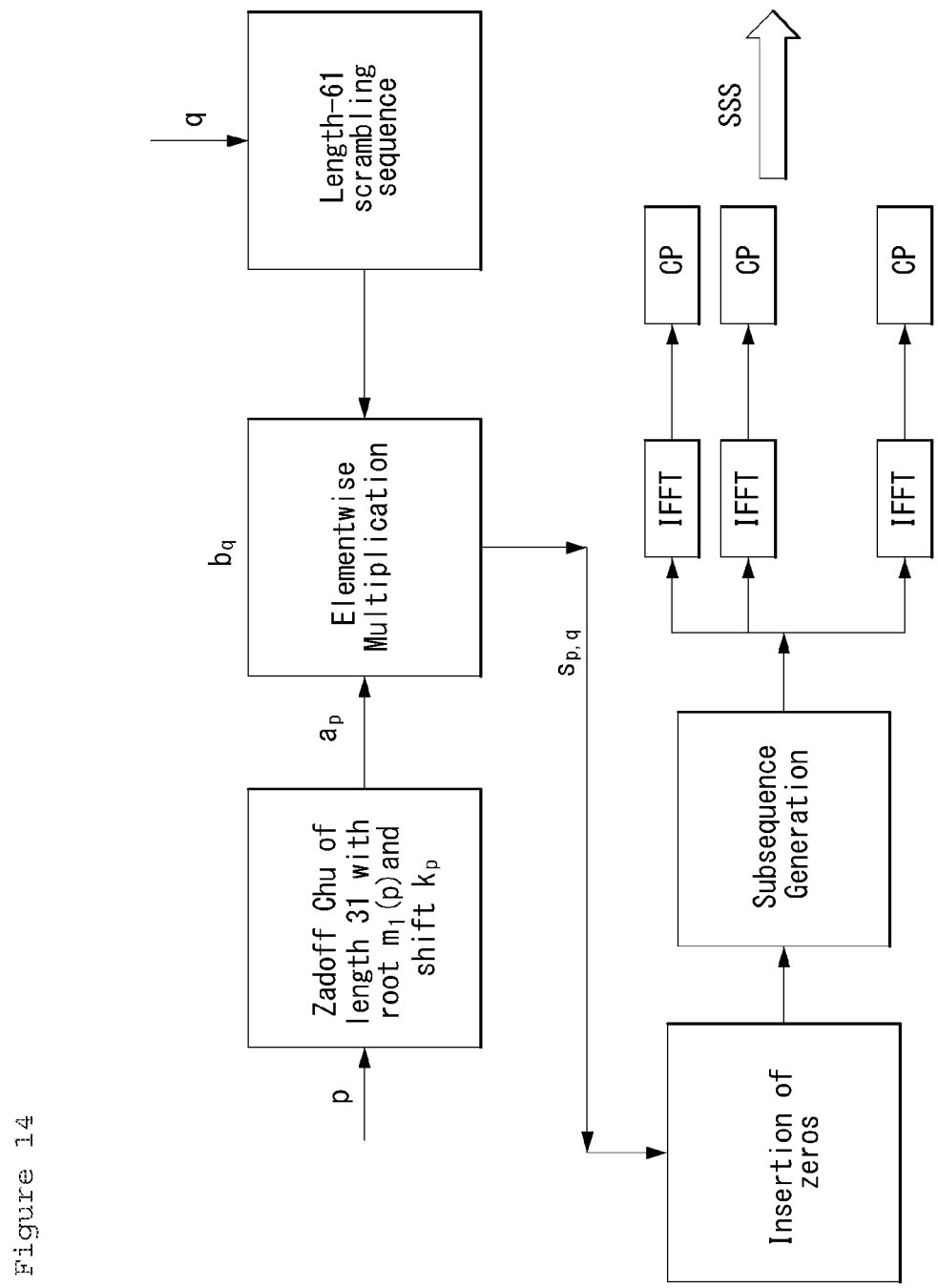
FIG. 14 is a diagram illustrating a method for generating M-SSS according to an embodiment of the present invention.

FIG. 14 is a diagram illustrating a method for generating M-SSS according to an embodiment of the present invention.

Referring to FIG. 14, the M-SSS may be defined as s_p,q(n)=a_p(n)·b_q(n). Herein, p={0, 1, ..., 503} represents cell identifiers and q={0, 1, 2, 3} determines the position of the M-SSS (i.e., the number of M-SSS within the block of 80 ms which is generated before the latest SSS). In addition, a_p(n) and b_q(n) may be determined by Equations 16 and 17 below.

$$a_p(n) = 0, \quad n = \{0-4, 66-71\}s^i \quad \text{[Equation 16]}$$
$$= a_p(n - k_p - 5), \quad n = \{5, 6, \ldots, 65\}s^i$$
$$a_p(n) = e^{-\frac{j\pi m(p)n(n+1)}{61}}, \quad n = \{0, 1, \ldots, 61\}s^i$$

$$b_q(n) = b(\mathrm{mod}(n - l_q, 63)) \quad n = \{0, 1, \ldots 60\}, \quad \text{[Equation 17]}$$
$$q = \{0, 1, 2, 3\}, \quad l_0 = 0, l_1 = 3, l_2 = 7, l_3 = 11s^i$$
$$b(n + 6) = \mathrm{mod}(b(n) + b(n + 1), 2),$$
$$n = \{0, 1, \ldots 55\}, s^i$$
$$b(0) = 1, b(m) = 0, \quad m = \{1, 2, 3, 4, 5\}s^i$$

Referring to Equation 16, a_p(n) is the ZC sequence and determines a cell identifier group. m(p) and cyclic shift k_p may be used for providing a specific cell identifier. Referring to Equation 17, b_q(n) may be the scrambling sequence that includes a cyclic shift of the basic sequence b_(n), and may be used for indicating the position of the M-SSS in the M-frame in order to acquire the frame timing. The cyclic shift l_q may be determined according to the value q.

The value of m(p) with respect to the specific p may be determined such as m(p)=1+mod(p, 61), the value of k_p may be determined such as k_p=7[p/61].

Figure 15:
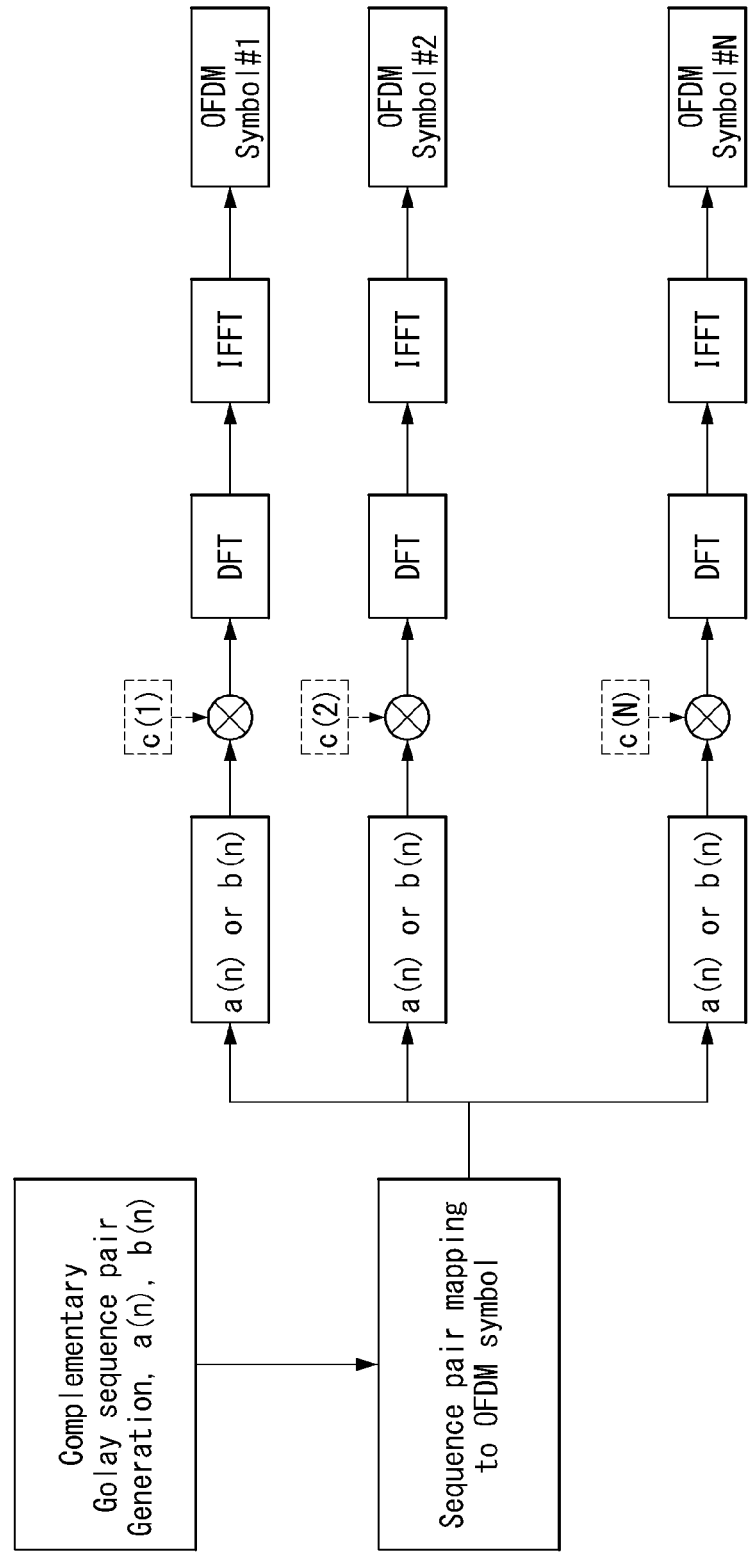
FIG. 15 illustrates an example of a method for implementing M-PSS to which the method proposed in the present disclosure can be applied.

FIG. 15 illustrates an example of a method for implementing M-PSS to which the method proposed in the present disclosure can be applied.

Particularly, FIG. 15 shows a method for generating an M-PSS using a complementary Golay sequence.

As shown in FIG. 15, using a complementary Golay sequence pair, a CGS that is going to be transmitted to each OFDM symbol is selected (i.e., select a(n) or b(n)).

Next, in the case of using a cover code, c(1) to c(N) may be multiplied to each CGS, and in the case of not using the cover code, 1 may be inputted to all of c(n).

Subsequently, the DFT and the IFFT are performed for each symbol, and transmitted to each OFDM symbol on time domain.

Additionally, the ZC sequence of length 12 may also generate a sequence that is going to be transmitted to each OFDM symbol.

In this case, by using the same method applied in FIG. 15, the M-PSS may be implemented.

Operation System of the NB LTE System

Figure 16:
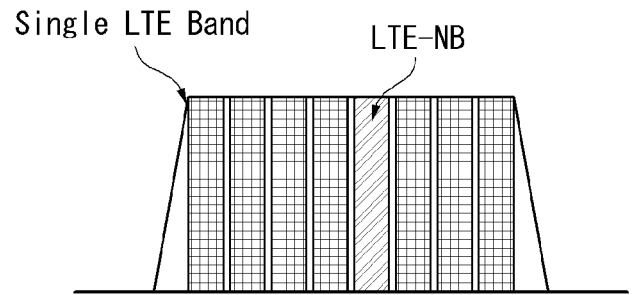
FIG. 16 illustrates an example of an operation system of the NB LTE system to which the method proposed in the present disclosure can be applied.
Figure 16:
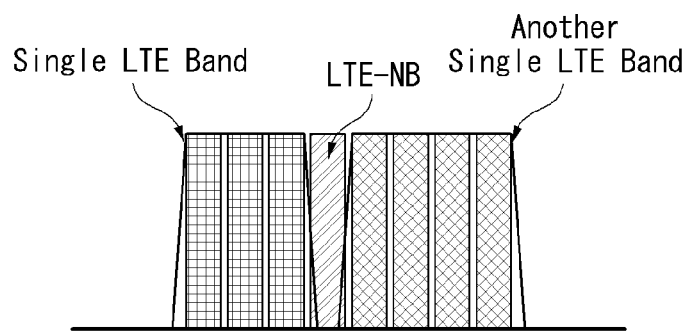
Figure 16:
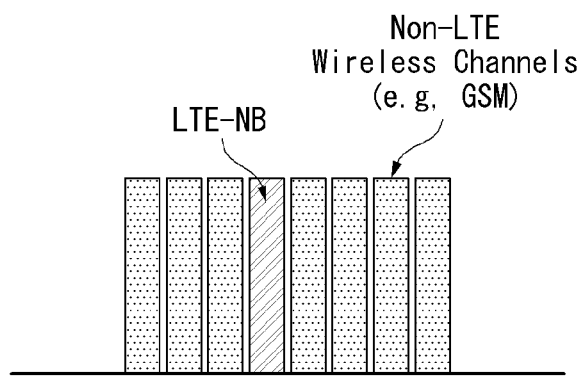

FIG. 16 illustrates an example of an operation system of the NB LTE system to which the method proposed in the present disclosure can be applied.

Particularly, FIG. 16(a) shows an In-band system, FIG. 16(b) shows a Guard-band system, and FIG. 16(c) shows a Stand-alone system.

The In-band system may be expressed by an In-band mode, the Guard-band system may be expressed by a Guard-band mode, and the Stand-alone system may be expressed by a Stand-alone mode.

The In-band system shown in FIG. 16(a) is referred to as a system or a mode in which a specific 1 RB in the legacy LTE band is used for the NB-LTE (or LTE-NB), and may be operated by allocating a part of the resource blocks of the LTE system carrier.

The legacy LTE band has the guardband of minimum 100 kHz in the last part of each LTE band.

In order to use 200 kHz, two non-contiguous guardband may be used.

The In-band system and the Guard-band system represent the structure in which the NB-LTE is coexisted in the legacy LTE band.

On the contrary, the Stand-alone system shown in FIG. 16(c) is referred to as a system or a mode which is independently constructed from the legacy LTE band, and may be operated by separately allocating the frequency band (the GSM reallocated carrier later) used in GERAN.

Figure 17:
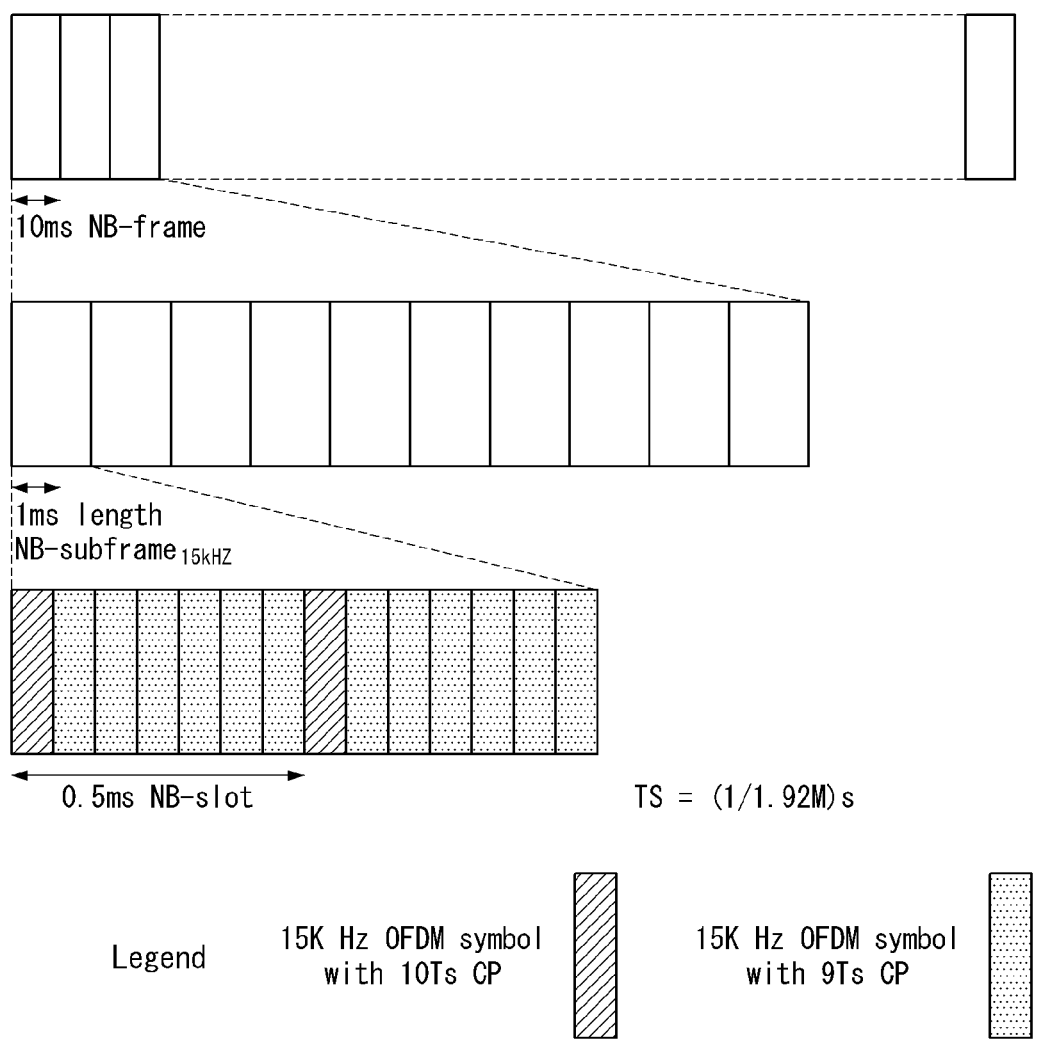
FIG. 17 illustrates an example of an NB-frame structure with respect to 15 kHz subcarrier spacing to which the method proposed in the present disclosure can be applied.

FIG. 17 illustrates an example of an NB-frame structure with respect to 15 kHz subcarrier spacing to which the method proposed in the present disclosure can be applied.

As shown in FIG. 17, it is shown that the NB-frame structure for the subcarrier spacing of 15 kHz is the same as the frame structure of the legacy system (LTE system).

That is, the NB-frame of 10 ms includes ten NB-subframes of 1 ms, and the NB-subframe of 1 ms includes two NB-slot of 0.5 ms.

Figure 18:
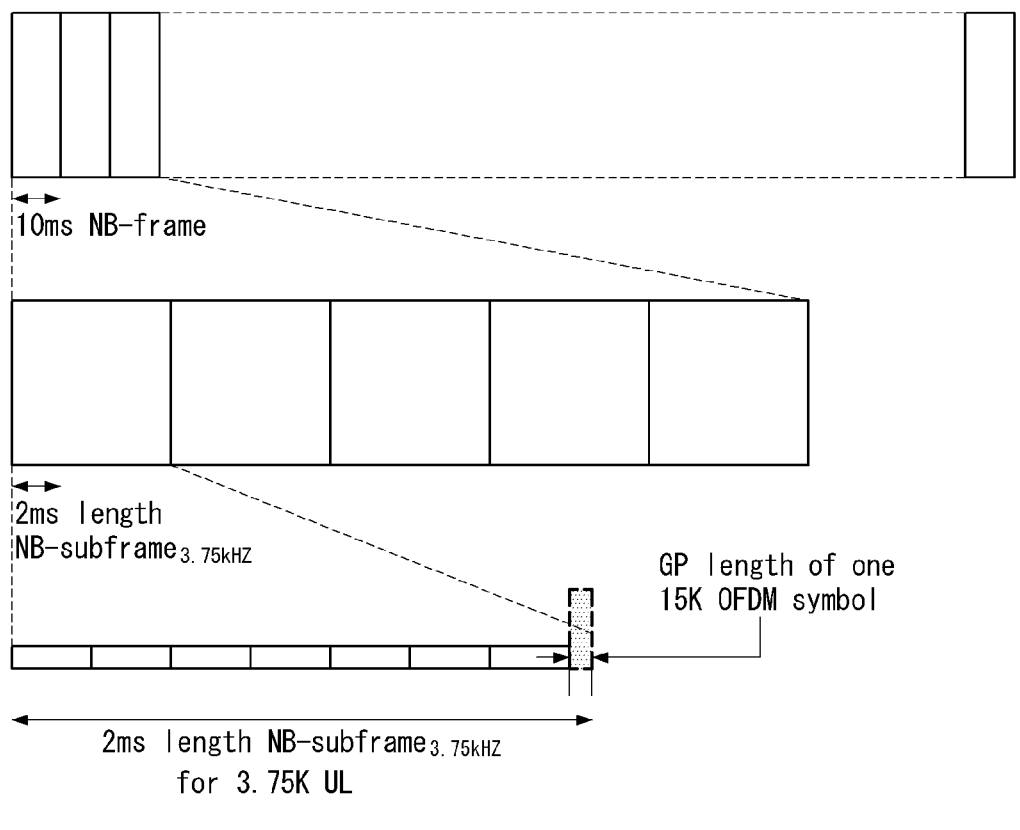
FIG. 18 illustrates an example of an NB-frame structure with respect to 3.75 kHz subcarrier spacing to which the method proposed in the present disclosure can be applied.

FIG. 18 illustrates an example of an NB-frame structure with respect to 3.75 kHz subcarrier spacing to which the method proposed in the present disclosure can be applied.

Referring to FIG. 18, the NB-frame of 10 ms includes five NB-subframes of 2 ms, and the NB-subframe of 2 ms includes seven OFDM symbols and a guard period (GP).

The NB-subframe of 2 ms may also be expressed by an NB-slot, an NB-resource unit (RU), or the like.

Figure 19:
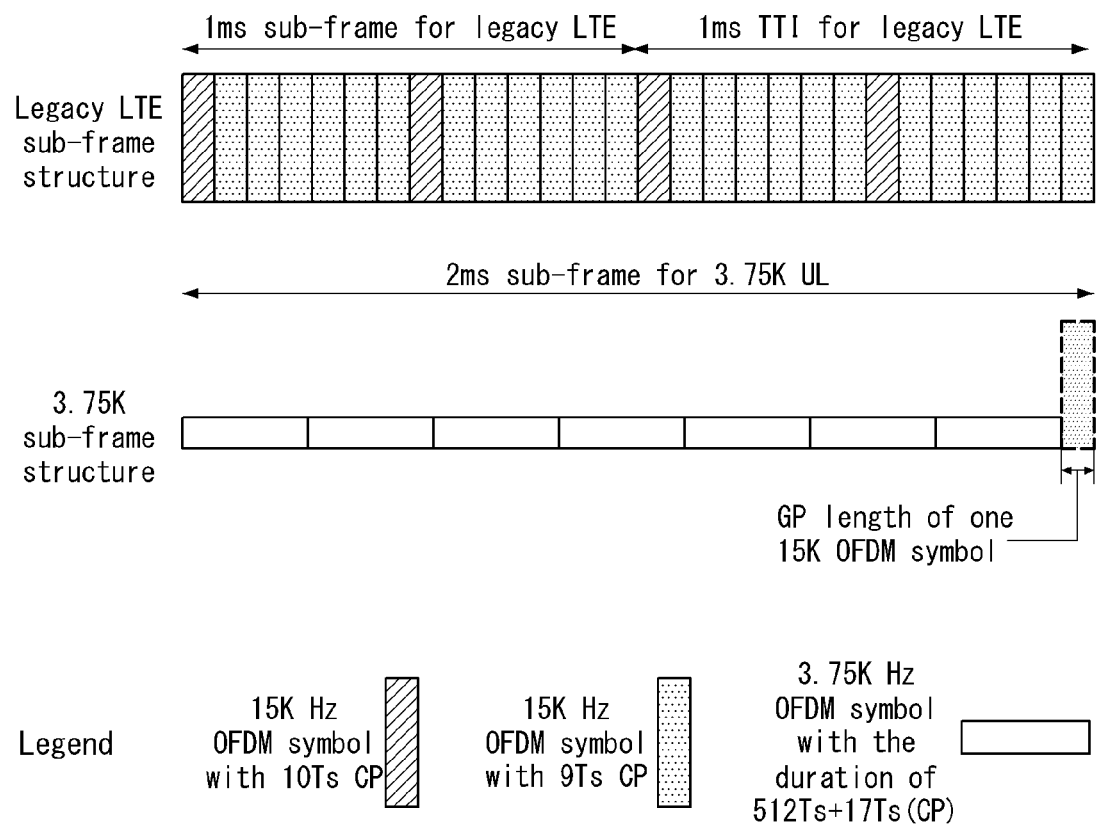
FIG. 19 illustrates an example of an NB subframe structure in 3.75 kHz subcarrier spacing to which the method proposed in the present disclosure can be applied.

FIG. 19 illustrates an example of an NB subframe structure in 3.75 kHz subcarrier spacing to which the method proposed in the present disclosure can be applied.

FIG. 19 shows the correspondence relation between the legacy LTE subframe structure and the subframe structure of 3.75 kHz.

Referring to FIG. 19, it is shown that the subframe (2 ms) of 3.75 kHz corresponds to two subframes of 1 ms (or TTI of 1 ms) of the legacy LTE.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (Cal), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

Figure 20:
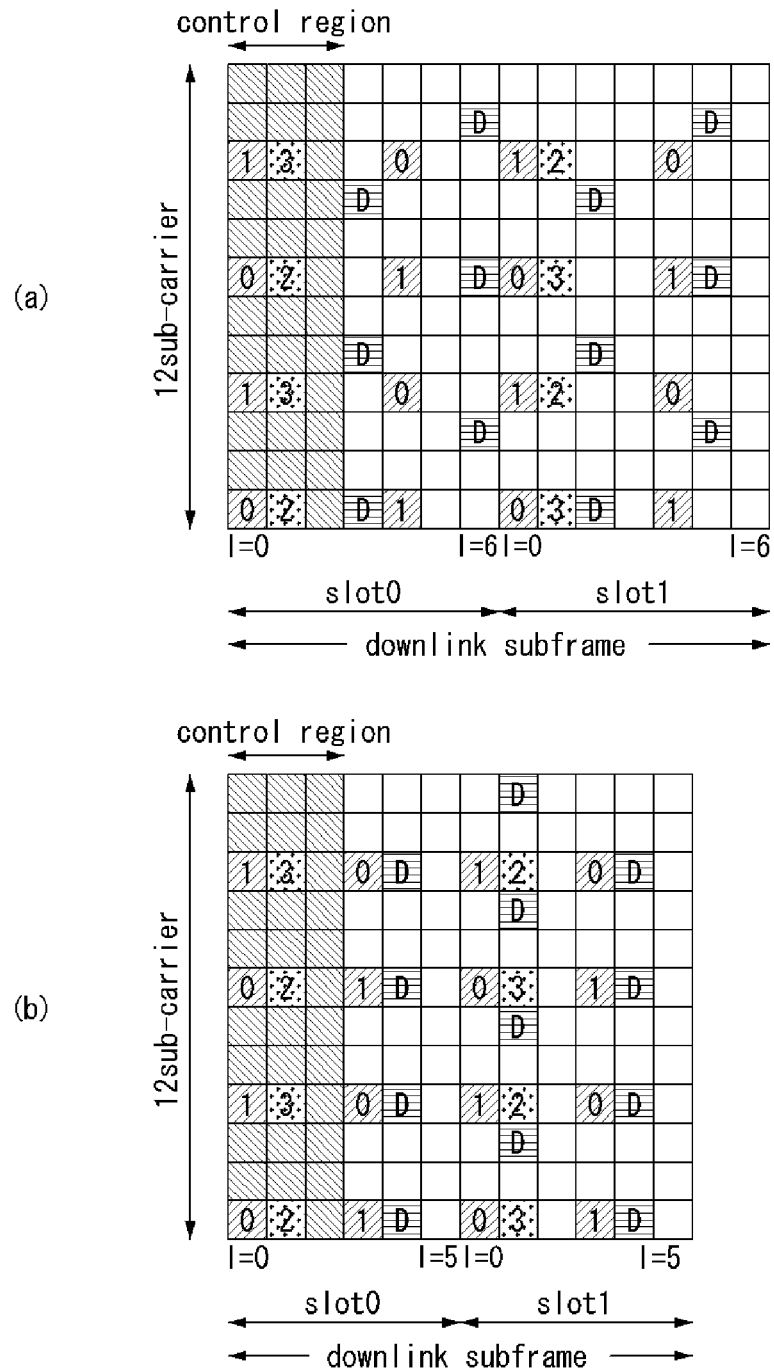
FIG. 20 illustrates a reference signal pattern mapped to a downlink resource block pair in a wireless communication system to which the present invention can be applied.

FIG. 20 illustrates a reference signal pattern mapped to a downlink resource block pair in the wireless communication system to which the present invention can be applied.

Referring to FIG. 20, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 20a) and a length of 12

OFDM symbols in the case of an extended cyclic prefix (CP) (FIG. 20b). Resource elements (REs) represented as 0, 1, 2, and '3' in a resource block lattice mean the positions of the CRSs of antenna port indexes 0, 1, 2, and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 18]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

-continued $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 18, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 19 shows the case of the normal CP and Equation 20 shows the case of the extended CP.

$$k = (k') \bmod N_{sc}^{RB} + N_{sc}^{RB} \cdot n_{PRB} \quad \text{[Equation 19]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 20]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 19 and 20, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes at least 4 downlink transmitting antennas or maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which UE belongs such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

Figure 21:
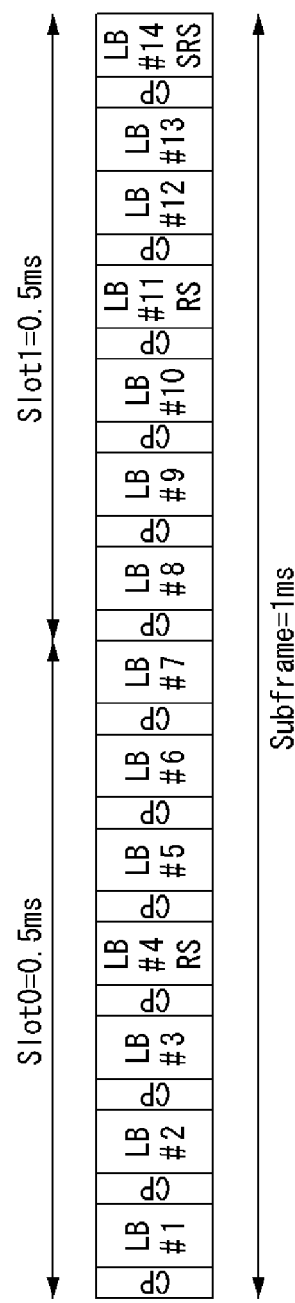
FIG. 21 illustrates an uplink subframe including a sounding reference signal symbol in a wireless communication system to which the present invention can be applied.

FIG. 21 illustrates an uplink subframe including a sounding reference signal symbol in a wireless communication system.

Referring to FIG. 21, an SRS is transmitted through the last SC-FDMA symbol on the arranged subframes always. Accordingly, the SRS and the DMRS are located in different SC-FDMA symbols.

A PUSCH data transmission is not allowed in a specific SC-FDMA symbol for an SRS transmission, and consequently, even in the case that the sounding overhead is the highest, that is, in the case that an SRS symbol is included in all subframes, the sounding overhead does not exceed about 7%.

Each SRS symbol is generated by a basic sequence (a random sequence or a sequence set based on Zadoff-Ch (ZC)) for a given time unit and a frequency band, and all terminals in the same cell use the same basic sequence. In this case, the SRS transmission from a plurality of terminals in the same cell in the same frequency band and the same time is distinguished by being orthogonal by different cyclic shifts of the basic sequence.

By being allocated with different basic sequence for each cell, the SRS sequence from different cells may be distinguished, but the orthogonality is not guaranteed between different basic sequences.

Hereinafter, in a wireless communication system that supports the narrow band internet of things (NB-IoT) or the NB-LTE, a method for configuring or constructing a DMRS will be described by considering characteristics of a single subcarrier transmission or a multiple subcarrier transmission.

As described above, the Narrowband (NB)-LTE is referred to as a system for supporting low complexity and low power consumption which has the system bandwidth (BW) that corresponds to 1 Physical Resource Block (PRB) or 1 RB of the LTE system.

That is, the NB-LTE system may be used for a communication scheme for implementing the IoT by supporting a device (or a terminal) such as a machine-type communication (MTC) in a cellular system mainly.

In addition, the NB-LTE system uses the same OFDM parameters such as a subcarrier spacing used in the conventional LTE system, and accordingly, an additional band allocation is not required for the NB-LTE system.

That is, by allocating 1 PRB of the legacy LTE system band for the NB-LTE use, there is an advantage in that frequency may be efficiently used.

The physical channel in the NB-LTE system is to be expressed or called by adding prefix N- (or Narrowband-) for distinguishing it from the physical channel in the LTE system.

In addition, the NB-IoT considers the situation that a plurality of terminals accesses through limited communication resources, and aims to support wider coverage than that of the legacy LTE.

A representative characteristic of the NB-IoT is to consider a single subcarrier transmission in an uplink situation.

As such, in the case of using the single subcarrier transmission in the NB-IoT, a problem may be solved in various aspects such as deficiency of subcarrier resources, extreme coverage support, and so on.

However, since a transmission in a unit of resource block (RB) is considered in the legacy LTE system, the transmission technique in the conventional legacy LTE system may not be used as it is in the NB-IoT system.

Accordingly, in the NB-IoT system, definition of new physical channel is required.

As described above, the Demodulate reference signal (DMRS) is used for a transmission of the PUSCH or the PUCCH in an uplink channel, and for channel estimation for the coherent demodulation.

A DMRS symbol in the legacy LTE system is located in the third symbol and the tenth symbol in a single subframe.

In this case, the DMRS is constructed or configured in a sequence form in frequency domain of each symbol.

In addition, the configuration of the DMRS is defined as a multiple length of a subcarrier in a single RB. 1 RB includes 12 subcarriers.

However, in the case of using a single subcarrier uplink transmission in the NB-IoT system, there is not enough length to apply the sequence in frequency domain.

Owing to this reason, a new DMRS configuration (or design) that is usable in the NB-IoT system is required.

Accordingly, the present disclosure proposes a method for constructing, configuring or designing a DMRS sequence in the situation of a single subcarrier transmission or a multi subcarrier transmission of the NB-IoT system.

According to the DMRS sequence configuration method proposed in the present disclosure, a DMRS sequence is generated in time domain, and the method deals with the following methods: (1) a method for mapping the DMRS sequence to each symbol, (2) a method for acquiring a coverage extension through a symbol combination between symbols, and (3) a method for randomizing an inter-cell interference.

The method proposed in the present disclosure limitedly describes the PUSCH in the NB-IoT for the convenience of understanding, but the contents and concept for it may also be applied to a transmission of uplink by all systems that use a single carrier transmission/a transmission of a downlink data channel and uplink/a transmission of a downlink control channel.

In addition, it is understood that the method proposed in the present disclosure is also applicable to a transmission (e.g., 2 or 3 subcarriers) through multiple subcarriers.

DMRS Design for Uplink Channel with Single Subcarrier

In the NB-IoT system, a basic scheduling unit is 1 subcarrier.

Accordingly, the NB-IoT system may have a Transmission Time Interval (TTI) which is longer than the legacy LTE system of 1 RB unit.

As a simple example, a single subcarrier unit should have a TTI of twelve times of 1 RB unit such that a single subcarrier unit and 1 RB unit that use the same subcarrier spacing support the same Transport Block (TB) size.

In this case, the single subcarrier scheduling unit includes twelve subframes.

In the case of considering 15 kHz subcarrier spacing, the TTI of the single subcarrier scheduling unit is 12 ms.

In the case of considering 3.75 kHz subcarrier spacing, the single subcarrier scheduling unit may be 48 ms (1 ms*12*4) which is four time thereof.

As such, in the present disclosure, a method for designing or configuring a DMRS is considered in the long TTI situation in which several subframes are bound in a single scheduling unit.

In more general, when the TTI length of the legacy LTE is x, the transmission through the single subcarrier of the NB-IoT may be transmitted through as much as m*X.

Herein, m may be determined according to the subcarrier spacing of the single subcarrier.

In addition, when the number of subcarriers increases from 1 to N, the transmission through the single subcarrier of the NB-IoT may be transmitted through as much as m/floor (12/N)*X.

On the other hand, in the case that the multiple carriers are used, the duration which is the same as the size of TTI used in the single carrier may be assumed. And it may be assumed that the size of TB that may be transmitted in the corresponding TTI linearly increases as much as the subcarrier number which is scheduled in the TB size that may be transmitted to a single carrier.

Otherwise, when the scheduled number of subcarriers is k, the TBS may be calculated using the k subcarriers which are scheduled with the MCS in order to determine the TBS.

That is, in the case of using several subcarriers, greater TB than that of using the single carrier may be transmitted.

When assuming that a single carrier *m is one resource block (RB), in the case of multiple carriers similar concept with allocating several resource blocks may be applied.

Next, a method for configuring a DMRS for an uplink channel in the NB-IoT system will be described in more detail by reference to (1) to (6) below.

(1) DMRS Sequence Design on Time Domain

First, the situation that several DMRS symbols are located (or included) in a single subframe is considered.

The position of multiple DMRS symbols in a subframe may be mapped in the same pattern as the legacy LTE system, or the DMRS symbol may be mapped in a newly defined pattern for the NB-IoT system.

For example, in the case of using the frame structure of the legacy LTE system, the DMRS is allocated to the position of the third and tenth symbols of each subframe.

In the case that the TTI is determined to be 12 ms with using 15 kHz subcarrier spacing, the total number of the DMRS symbols positioned in a single TTI is 24 (2*12).

In addition, in the case that the TTI is determined to be 48 ms with using 3.75 kHz subcarrier spacing, the number of the DMRS symbols positioned in a single TTI is also 24 DMRS symbols, same as the case of using 15 kHz subcarrier spacing.

Since each DMRS symbol has a single subcarrier, the sequence structure in frequency domain cannot be used.

Accordingly, hereinafter, a method of using the DMRS sequence in time domain proposed in the present disclosure will be described.

For example, in the case that $s_{DMRS}(n)$, n=0, 1, ..., $M^{DMRS}-1$ is the DMRS sequence of $M^{DMRS}$ length, a method of sequentially mapping each element of the DMRS sequence to the DMRS symbol position of time domain may be used.

As such, the DMRS sequence generated in time domain should be designed or configured in a direction of satisfying the conditions of the existing DMRS sequence such as the auto-correlation property, the cross correlation property, and so on.

As an example of satisfying the conditions of the existing DMRS sequence, a method of using the existing legacy DMRS sequence generation method in the time domain direction may be considered.

In the NB-IoT system that uses the 15 kHz subcarrier spacing and the 12 ms TTI, for example, the QPSK RS sequence of 2 RB-length (24 length sequence) may be used in the legacy LTE system.

The reason is because the number of total DMRS symbol per TTI is 24 in the NB-IoT system that uses the 15 kHz subcarrier spacing and the 12 ms TTI. Accordingly, in order to map the DMRS sequence in time domain, the sequence of length 24 may be used.

This may be identically applied to the case of using the 3.75 kHz subcarrier spacing and the 48 ms TTI.

In this case, the generation of the DMRS sequence is according to Equation 21 below.

$$s_{DMRS}(n) = e^{j\varphi(n)\pi/4}, \; n=0,1,\ldots,M^{DMRS}-1 \quad \text{[Equation 21]}$$

Herein, $\varphi(n)$ contains the phase information of each sequence element, and may be determined according to the Table (refer to Table 3 and Table 4 below) defined in the legacy LTE system.

Table 3 represents an example of the phase information for the length 12 sequence, and Table 4 represents an example of the phase information for the length 24 sequence.

TABLE 3

| u | $\varphi(0), \ldots, \varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 4

| u | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |

TABLE 4-continued

| u | φ(0), . . . , φ(23) |
|---|---|
| 3 | -1 -3 1 1 3 -3 1 1 -3 -1 -1 1 3 1 3 1 -1 3 1 1 -3 -1 -3 -1 |
| 4 | -1 -1 -1 -3 -3 -1 1 1 3 3 -1 3 -1 1 -1 -3 -3 1 -3 -1 -3 |
| 5 | -3 1 1 3 -1 1 3 1 -3 1 -3 1 1 -1 -1 3 -1 -3 3 -3 -3 -3 1 1 |
| 6 | 1 1 -1 -1 3 -3 -3 3 -3 1 -1 -1 1 -1 1 1 -1 -3 -1 1 -1 3 -1 -3 |
| 7 | -3 3 3 -1 -1 -3 -1 3 1 3 1 3 1 1 -1 3 1 -1 1 3 -3 -1 -1 1 |
| 8 | -3 1 3 -3 1 -1 -3 3 -3 3 -1 -1 -1 -1 1 -3 -3 -3 1 -3 -3 -3 1 -3 |
| 9 | 1 1 -3 3 3 -1 -3 -1 3 -3 3 3 3 -1 1 1 -3 1 -1 1 1 -3 1 1 |
| 10 | -1 1 -3 -3 3 -1 3 -1 -1 -3 -3 -3 -1 -3 -3 1 -1 1 3 3 -1 1 -1 3 |
| 11 | 1 3 3 -3 -3 1 3 1 -1 -3 -3 -3 3 3 -3 3 3 -1 -3 3 -1 1 -3 1 |
| 12 | 1 3 3 1 1 1 -1 -1 1 -3 3 -1 1 1 -3 3 3 -1 -3 3 -3 -1 -3 -1 |
| 13 | 3 -1 -1 -1 -1 -3 -1 3 3 1 -1 1 3 3 -1 1 1 -3 1 3 -1 -3 3 |
| 14 | -3 -3 3 1 3 1 -3 3 1 3 1 1 3 3 -1 -1 -3 1 -3 -1 3 1 1 3 |
| 15 | -1 -1 1 -3 1 3 -3 1 -1 -3 -1 3 1 3 1 -1 -3 -3 -1 -1 -3 -3 -3 -1 |
| 16 | -1 -3 3 -1 -1 -1 -1 1 1 -3 3 1 3 3 1 -1 1 -3 1 -3 1 1 -3 -1 |
| 17 | 1 3 -1 3 3 -1 -3 1 -1 -3 3 3 3 -1 1 1 3 -1 -3 -1 3 -1 -1 -1 |
| 18 | 1 1 1 1 1 -1 3 -1 -3 1 1 3 -3 1 -3 -1 1 1 -3 -3 3 1 1 -3 |
| 19 | 1 3 3 1 -1 -3 3 -1 3 3 3 -3 1 -1 1 -1 -3 -1 1 3 -1 3 -3 -3 |
| 20 | -1 -3 3 -3 -3 -3 -1 -1 -3 -1 -3 3 1 3 -3 -1 3 -1 1 -1 3 -3 1 -1 |
| 21 | -3 -3 1 1 -1 1 -1 1 -1 3 1 -3 -1 1 -1 1 -1 -1 3 3 -3 -1 1 -3 |
| 22 | -3 -1 -3 3 1 -1 -3 -1 -3 -3 3 -3 3 -3 -1 1 3 1 -3 1 3 3 -1 -3 |
| 23 | -1 -1 -1 -1 3 3 3 1 3 3 -3 1 3 -1 3 -1 3 3 -3 3 1 -1 3 3 |
| 24 | 1 -1 3 3 -1 -3 3 -3 -1 -1 3 -1 3 -1 -1 1 1 1 1 -1 -1 -3 -1 3 |
| 25 | 1 -1 1 -1 3 -1 3 1 1 -1 -1 -3 1 1 -3 1 3 -3 1 1 -3 -3 -1 -1 |
| 26 | -3 -1 1 3 1 1 -3 -1 -1 -3 3 -3 3 1 -3 3 -3 1 -1 1 -3 1 1 1 |
| 27 | -1 -3 3 3 1 1 3 -1 -3 -1 -1 -1 3 1 -3 -3 -1 3 -3 -1 -3 -1 -3 -1 |
| 28 | -1 -3 -1 -1 1 -3 -1 -1 1 -1 -3 1 1 -3 1 -3 -3 3 1 1 -1 3 -1 -1 |
| 29 | 1 1 -1 -1 -3 -1 3 -1 3 -1 1 3 1 -1 3 1 3 -3 -3 1 -1 -1 1 3 |

In addition, in order to map the DMRS sequence to time domain, a single TTI may be divided into several sections, and the length of the DMRS sequence may be matched to the divided sections.

In this case, a single TTI may have the structure in which two or more DMRS sequences are mapped to a single TTI.

Here, a plurality of DMRS sequences mapped to a single TTI may use the same sequence or different sequences.

The reason why considering such an operation may be for the frequency hopping occurred in a single TTI section, the application of cover code, and so on.

Additionally, a method of using a plurality of short DMRS sequences in a single TTI will be described.

In the case that the NB-IoT system that uses the 15 kHz subcarrier spacing and the 12 ms TTI uses the legacy LTE frame structure, total 24 DMRS symbols may be used.

In this case, when the DMRS symbol is divided into two groups by 12 DMRS symbols for each group, the sequence expressed by each symbol group may use two QPSK RS sequences generated based on 1 RB (refer to Table 3) in the legacy LTE system.

This method may be identically applied to the case of using the 3.75 kHz subcarrier spacing and the 48 ms TTI.

Figure 22:
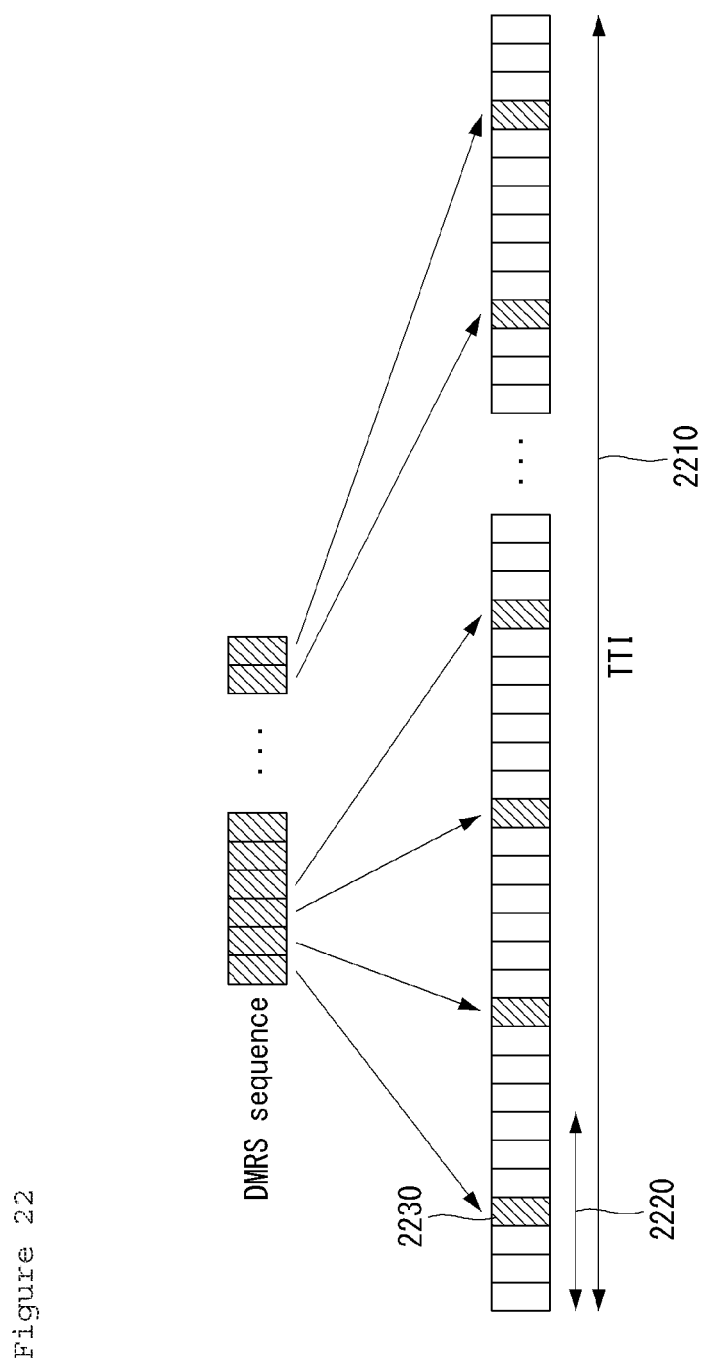
FIG. 22 is a diagram illustrating an example of a method for mapping a DMRS sequence in time domain proposed in the present disclosure.

FIG. 22 is a diagram illustrating an example of a method for mapping a DMRS sequence in time domain proposed in the present disclosure.

That is, FIG. 22 shows a method for mapping a DMRS sequence in a single TTI.

Referring to FIG. 22, it is shown that the DMRS sequence or each element of the DMRS sequence is mapped to the fourth symbol 2230 in each slot 2220 in a single TTI 2210.

For example, in the case that the length of the DMRS sequence is 16, the DMRS sequence has 16 elements, and each element corresponds to $S_{DMRS}(0)$ to $S_{DMRS}(15)$.

(2) DMRS Density

Next, in relation to the method for configuring a DRMS in the NB-IoT system, the DMRS density will be described.

The DMRS density may be the concept in relation to the number of the DMRS symbol or the position of the DMRS symbol.

Accordingly, the fact that the DMRS density is high or low may be interpreted that an interval between the DMRSs is narrow or wide, etc.

As a method for determining a position of the DMRS symbol, a method of following the existing legacy LTE system may be existed.

However, owing to the characteristics of the NB-IoT system, the case may be existed that the way of the DMRS being located is different from the legacy LTE way.

For example, in the case of the 3.75 kHz subcarrier spacing, the interval between the DMRSs becomes wide while the length of a time unit is elongated, and owing to the problem such as frequency offset, etc., the DMRS position of closer interval may be required.

However, when the number of DMRSs increases, the number of symbols that may send data decreases.

Accordingly, considering above two situations, an appropriate position distribution for the DMRS is required.

The method for determining the DMRS density may be classified into (1) Adaptive DMRS density determination method (method 1) and (2) Periodic DMRS density determination method (method 2).

Method 1: Adaptive DMRS Density

First, the adaptive DMRS density determination method will be described.

In the case that the density of DMRS should be increased, for example, in the case that the influence of frequency offset is great or the influence of the Doppler spread is great, more DMRS sequences may be required.

In addition, in the case of transmitting the DMRS sequence in time domain, the increase of the DMRS sequence may be required to obtain the combining gain adequately.

For this, the present disclosure proposes an Adaptive DMRS density determination method.

First, all terminals (e.g., UEs) share basic DMRS positions always.

As an example, in case of following the DMRS pattern of the legacy LTE system, all terminals may commonly use the third and tenth symbols of a frame or a subframe (or the third symbol of each slot) for a DRS transmission.

Here, in the case that there is a terminal that requires higher DMRS density, a symbol for the DMRS may be additionally allocated as well as the position of the existing DMRS symbol is maintained.

The position of the DMRS symbol added is available for the position of all symbols except the position of the DMRS symbol which is previously used.

Here, in order for a terminal to decide the density of DMRS, a BS may calculate all of the influences of a coverage class, a frequency offset and a Doppler spread of the terminal and notify them to the terminal through a signaling.

Otherwise, a terminal itself may determine its own coverage class and so on and decide a DMRS density directly.

In the case that a terminal itself decides its own DMRS density, the terminal should notify the information of the DMRS density (or number/position of DMRS symbol) decided by the terminal itself to a terminal through an uplink channel.

Method 2: Periodic DMRS Density

As described above, although the method of increasing the DMRS density has an advantage in increasing the channel estimation performance, there is a trade-off in that the number of symbols required for a data transmission decreases.

For this, method 2 proposes a method for increasing the DMRS density periodically without increasing the DMRS density in all sections.

That is, method 2 increases the DMRS density in a time unit in which predefined symbols generated every time T which is a predetermined period are aggregated, and enables to have a DMRS position occupied in all time units in the remaining sections.

The time unit in which predefined symbols are aggregated may be a symbol of set, a slot (or set of slot), a subframe (or set of subframe), a frame (or set of frame), and so on.

The DMRS density increased temporally may be used for the channel estimation such as a measurement of the frequency offset, a measurement of the Doppler spread, and the like.

Here, the pattern that the DMRS density is periodically changed may have a predetermined fixed value or may be adaptively changed.

In the case of adjusting the DMRS pattern adaptively, a BS may calculate all influences of the coverage class, the frequency offset and the Doppler spread of a terminal and notify them to the terminal through signaling.

Otherwise, a terminal itself may determine its own coverage class and so on and decide the DMRS density directly.

In the case that a terminal itself decides its own DMRS density, the terminal should notify the information of the DMRS density through an uplink channel.

In addition, a method of taking a separate cover code or a frequency ramp may be applied in the section in which the DMRS density is temporally increased.

Through this, a multiplexing effect may be increased or the effect of decreasing an inter cell interference may be expected.

(3) Base RS Sequence and Sequence Grouping with Phase Ramp on Time Domain

A DMRS sequence may have several basic sequences according to a predetermined rule.

Minimum at least one base sequence is allocated to each cell.

And, a terminal belonged to each cell determines a DMRS sequence according to the base sequence allocated.

Accordingly, the method of determining a DMRS sequence that corresponds to each cell may be decided based on a cell-ID.

In the legacy LTE system, a basic sequence constructs a sequence group through the cyclic shift (CT).

The CT uses the fact that the orthogonality is guaranteed between sequences which are generated in the case of different cyclic time shifts between terminals being applied to the DMRS sequence.

The cyclic time shift triggers a phenomenon such as a phase ramp is applied in frequency domain.

However, in the NB-IoT that uses the single subcarrier proposed in the present disclosure, a formation of sequence group that uses the CT is impossible since the DMRS sequence is directly mapped in time domain.

Accordingly, the present disclosure proposes a method of applying a phase directly to the DMRS sequence which is mapped in time domain for the sequence grouping.

In this case, the cyclic time shift is not generated in time domain, but generated in the phenomenon that each element of the DMRS sequence undergoes a phase rotation in phases.

That is, an Equation of the basic sequence to which the phase ramp is applied in time domain is as Equation 22 below.

$$s_i^{(\alpha)}(n) = e^{j\alpha n} \bar{s}_i^{(\alpha)}, \ n=0,1,\ldots,M^{DMRS}-1 \quad \text{[Equation 22]}$$

Herein, $\bar{s}_1^{(\alpha)}$ represents a base sequence, and a is a value that represents a slope of phase ramp that enables to distinguish different sequences.

In the case that one or more subcarriers or multiple subcarriers are scheduled, a method of mapping or generating the DMRS sequence may be different, for example, according to a TTI size.

For example, assuming the TTI size of 12 ms, in the case that multiple subcarriers (number k) are scheduled, a sequence is generated in the similar way of generating a sequence of RS in the subcarriers as much as 12*k.

And, a method of the time first/frequency next may be selected in the formality of mapping the DMRS sequence of the generated sequence in time domain from the first subcarrier and mapping the sequence in time domain to the next (or subsequent) subcarrier. Otherwise, in the case of the multiple subcarriers, the formality of mapping the sequence to each symbol by using a short sequence may be used.

As an example, in the case that three subcarriers are scheduled, the short sequence of a length that corresponds to the three subcarriers scheduled may be mapped to each OFDM symbol, or several OFDM symbols (e.g., four OFDM symbols) are tied and the longer sequence may be mapped in time domain axis.

(4) Cover Code for DMRS Sequence

Next, when assuming the DMRS sequence on time domain considering the single subcarrier transmission, a method of using a cover code in the DMRS sequence will be described.

The cover code described below may be used for increasing the number of terminals which are multiplexed in a cell, or may be used for randomizing interference between neighboring cells.

In order to apply the cover code to the NB-IoT that uses the single subcarrier transmission, two or more time units to which the DMRS sequence is applied are required.

The time unit may be used by dividing a single TTI into several units, and may also use several TTIs which are bound.

The DMRS sequence used in each time unit may be repeated by the same sequence, or may use different sequences.

In the case of using different sequences, the DMRS sequence may be changed in a sequence group, and may be a sequence in different sequence group that uses different base sequence.

That is, the cover code is applied in the way of multiplying the cover code to a plurality of time units.

Figure 23:
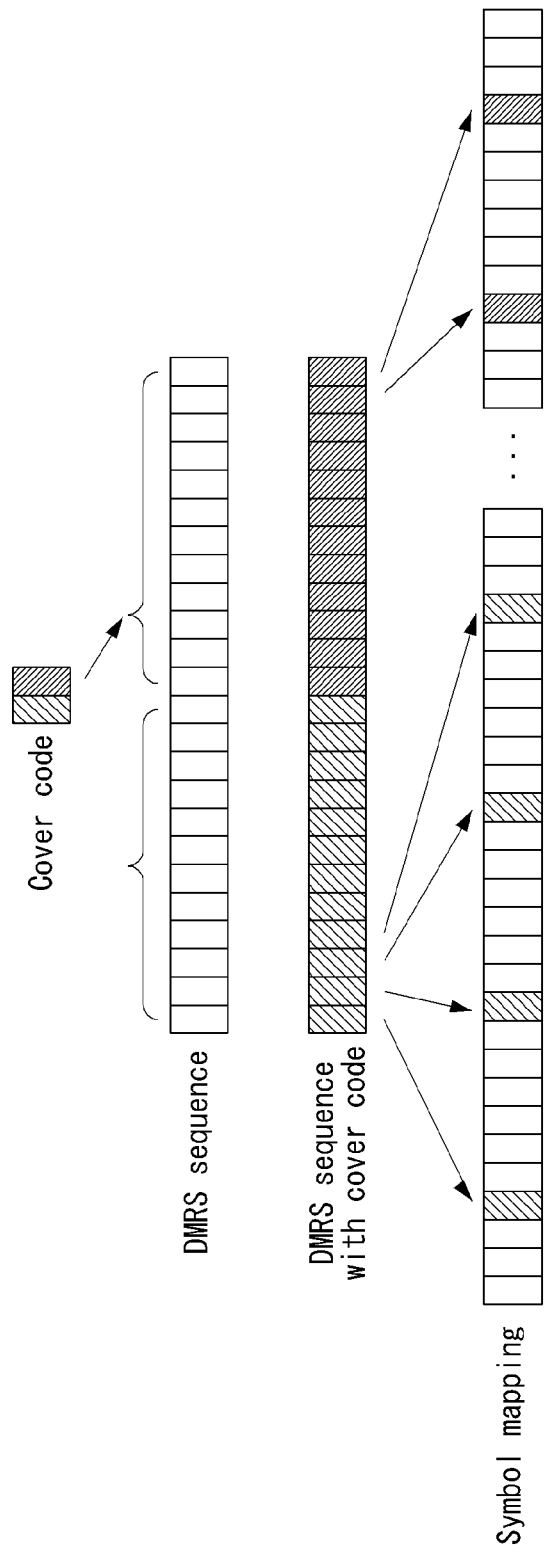
FIG. 23 is a diagram illustrating an example of the DMRS sequence to which a cover code is applied in time domain proposed in the present disclosure.

FIG. 23 is a diagram illustrating an example of the DMRS sequence to which a cover code is applied in time domain proposed in the present disclosure.

Referring to FIG. 23, it is shown that there are two time units that apply the DMRS sequence, and a cover code is applied to each time unit.

And, as shown in FIG. 22 described above, the DMRS sequence to which the cover code is applied is mapped to each symbol (e.g., the fourth symbol) in a TTI in time domain.

Here, both of an orthogonal cover code and a non-orthogonal cover code may be applied to the design of the cover code for the DMRS sequence.

In the case of applying the orthogonal cover code, it should be designed such that each cover code satisfies the orthogonal property with each other.

In addition, in the case of the non-orthogonal cover code, it should be designed that the orthogonal property is guaranteed as much as possible although the orthogonal property between codes is not perfect.

Furthermore, in the case that the cover code is used for multiplexing, the cover code should be designed in the orthogonal cover code method since different terminals should be perfectly distinguished in a cell.

On the other hand, in the case that the cover code is used for the purpose of the inter cell interference randomization, both of the orthogonal cover code method and the non-orthogonal cover code method may be considered.

(5) Sequence Group Hopping

Next, a sequence group hopping for the DMRS will be described.

The sequence group hopping may be used for the inter cell interference randomization, and may use the sequence group hopping method in the legacy LTE system.

Various methods may be considered for the sequence group hopping such as that of generated in TTI unit, set unit of TTI, time unit divided by TTI, and so on.

Otherwise, the sequence group hopping may not be performed according to the characteristics of a system.

(6) Frequency Hopping

Next, a frequency hopping in the NB-IoT system will be described.

A subcarrier index used in the NB-IoT system may use several indexes by hopping, not use a specific index by a terminal fixedly.

The existing frequency hopping is mainly used for obtaining the frequency diversity.

The frequency hopping in the NB-IoT system proposed in the present disclosure may be used for the inter cell interference randomization as well as increasing the frequency diversity.

Basically, the frequency hopping may be used for the frequency diversity of a data transmission, and may obtain the inter cell interference randomization as a subsequent phenomenon.

Accordingly, the frequency hopping pattern proposed in section (6) is implemented such that a hopping pattern is generated based on a cell-ID and the interference between neighboring cells is randomized.

As an example of the frequency hopping based on a cell-ID, a method of providing a frequency hopping interval differently based on a cell-ID may be considered.

In this case, the terminals in the same cell share the same frequency hopping interval, but the terminals in a neighboring cell have the frequency hopping interval of different length.

In this case, the frequency hopping interval may be identically maintained in every frequency hopping, and differently generated in every frequency hopping.

Here, a time unit for performing the frequency hopping may be determined according to a slot, a subframe, a frame, a group thereof or a TTI unit.

However, the time unit length of the frequency hopping may influence on the length of DMRS sequence.

Since the frequency hopping changes a subcarrier index used, the consecutive channel estimation may not be performed before and after the frequency hopping occurs.

This is because the channel estimation value is mutually effective only in the section that uses the same subcarrier index. Accordingly, the configuration of DMRS sequence may also be constructed or configured by considering a period of the frequency hopping.

As an example, when a period of the subframe for performing the multi-subframe channel estimation or the I/O symbol combining is Y, it may be assumed that the frequency hopping may be occurred in a period greater or the same as Y.

In the case that a period of the frequency hopping is greater than Y, it may be assumed that Y, which is a period for performing the multi-subframe channel estimation or the symbol combining, is the same as the period of the frequency hopping.

Figure 24:
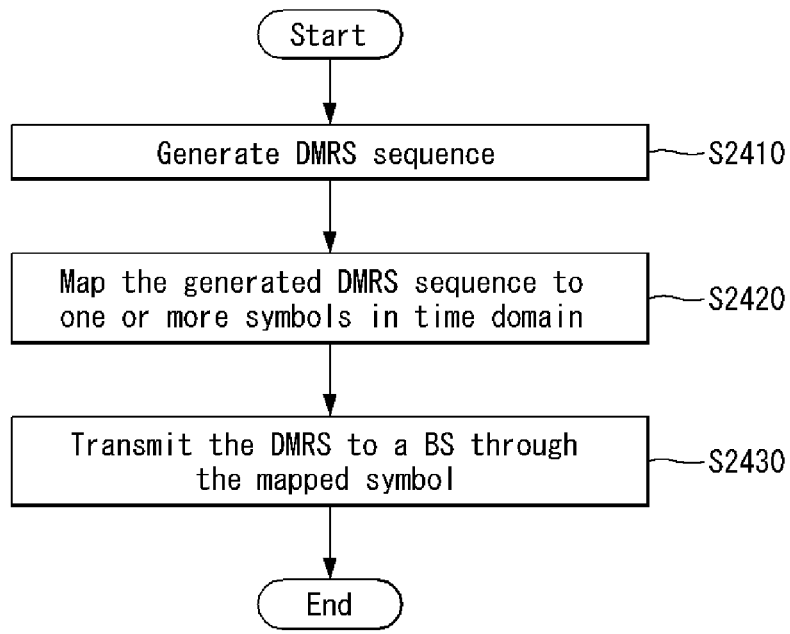
FIG. 24 is a flowchart illustrating an example of a DMRS transmission and reception method in the NB-IoT system through the DMRS configuration method proposed in the present disclosure.

FIG. 24 is a flowchart illustrating an example of a DMRS transmission and reception method in the NB-IoT system through the DMRS configuration method proposed in the present disclosure.

First, a terminal generates a DMRS sequence by considering a single subcarrier transmission or a multiple subcarrier transmission (step, S2410).

A subcarrier spacing in the single subcarrier transmission may be 15 kHz or 3.75 kHz.

In the case that the number of multiple subcarriers is 3, the length of generated DMRS sequence may be 3.

In addition, the DMRS sequence may be determined based on a cell-ID.

Later, the terminal maps the generated DMRS sequence to one or more symbols in time domain (step, S2420).

Here, in the case that the terminal transmits the DMRS through the single subcarrier, the terminal sequentially maps each element of the generated DMRS sequence to M symbol(s), respectively.

Herein, M is a natural number, and preferably, may mean a natural number greater than 1.

It may be interpreted that the DMRS sequence mapping method in the legacy LTE system is applied.

The reason is because only one subcarrier is existed in the case of the single subcarrier transmission (in 1 PRB) of the NB-IoT system. Accordingly, it may be that the generated DMRS sequence is not mapped in the ascending order of a subcarrier index (in a specific symbol), substantially.

That is, it is resulted that the generated DMRS sequence is mapped to DMRS symbols, that is, time domain only.

That is to say, first, the generated DMRS sequence is mapped in the ascending order of a symbol index, and then, in the ascending order of a slot number.

For reference, in the DMRS sequence mapping in the legacy LTE system, the generated DMRS sequence is mapped in the ascending order of a subcarrier index first, in the ascending order of a symbol index next, and then, in the ascending order of a slot number.

Accordingly, the meaning of each element of the generated DMRS sequence being sequentially mapped to M symbols, respectively, may be interpreted that it follows the DMRS sequence mapping method in the legacy LTE system, substantially.

In addition, in the case that the terminal transmits the DMRS through the multiple subcarriers, the terminal maps the generated DMRS sequence to N symbols.

Here, N is a natural number, and preferably, may mean a natural number greater than 1.

This means that the terminal maps the DMRS sequence that has the sequence length corresponding to the number of the multiple subcarriers to the DMRS symbol(s) in time domain.

Here, the meaning of the DMRS sequence that has the length corresponding to the number of the multiple subcarriers represents that the length of the generated DMRS sequence is the same as the number of the multiple subcarriers.

Each symbol of the M symbols and each symbol of the N symbols represent a specific symbol of a time unit that includes a predetermined number of symbols.

The time unit may be a symbol set, a slot, a subframe, a frame, and the like.

In addition, in the case that a subcarrier spacing in the single subcarrier transmission is 15 kHz, the specific symbol may be fourth symbol in the time unit.

Later, the terminal transmits the DMRS to a BS through the mapped symbol (step, S2430).

Additionally, in the case that the terminal transmits the DMRS through the single subcarrier, the orthogonal cover code or the non-orthogonal cover code may be applied to the generated DMRS sequence.

In addition, in the case that the terminal transmits the DMRS through the single subcarrier, the frequency hopping that has a hopping interval based on a cell-ID may be applied.

Furthermore, the DMRS is transmitted to the BS through a narrowband that has a bandwidth smaller than 200 kHz.

General Apparatus to which the Present Invention May be Applied

Figure 25:
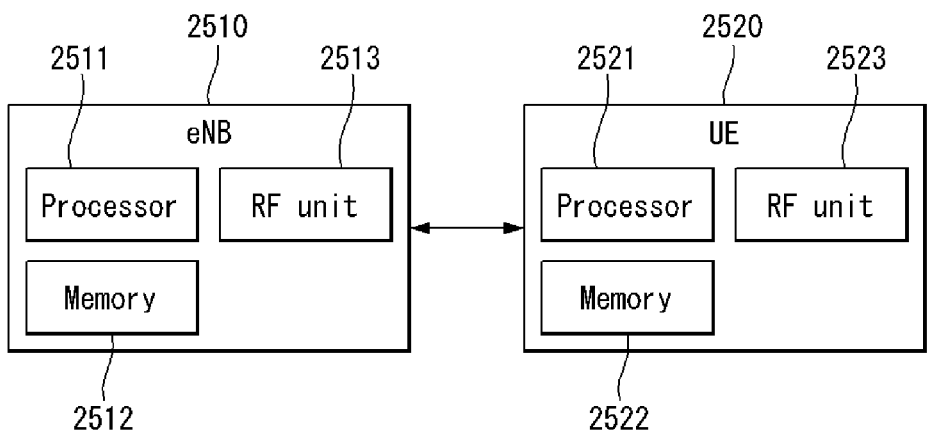
FIG. 25 illustrates a block diagram of a wireless communication apparatus according to an embodiment of the present invention.

FIG. 25 illustrates a block diagram of a wireless communication apparatus according to an embodiment of the present invention.

Referring to FIG. 25, the wireless communication system includes a BS (eNB) 2510 and a plurality of terminals (UEs) 2520 located within the region of the BS 2510.

The BS 2510 includes a processor 2511, a memory 2512 and a radio frequency (RF) unit 2513. The processor 2511 implements the functions, processes and/or methods proposed in FIGS. 1 to 24 above. The layers of wireless interface protocol may be implemented by the processor 2511. The memory 2512 is connected to the processor 2511, and stores various types of information for driving the processor 2511. The RF unit 2513 is connected to the processor 2511, and transmits and/or receives radio signals.

The terminal 2520 includes a processor 2521, a memory 2522 and a RF unit 2523. The processor 2521 implements the functions, processes and/or methods proposed in FIGS. 1 to 24 above. The layers of wireless interface protocol may be implemented by the processor 2521. The memory 2522 is connected to the processor 2521, and stores various types of information for driving the processor 2521. The RF unit 2523 is connected to the processor 2521, and transmits and/or receives radio signals.

The memories 2512 and 2522 may be located interior or exterior of the processors 2511 and 2521, and may be connected to the processors 2511 and 2521 with well known means. In addition, the BS 2510 and/or the terminal 2520 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

Although the present invention is described mainly for the example applied to 3GPP LTE/LTE-A system, it is also possible to be applied to various wireless communication system as well as 3GPP LTE/LTE-A system.

The present disclosure has an effect of efficiently performing channel estimation for an uplink channel using a DMRS in the NB-IoT system by newly defining a method for constructing or configuring a DMRS in a narrow band.

The effects of the present invention are not limited to the above-described effects and other effects which are not described herein will become apparent to those skilled in the art from the following description.

What is claimed is:

1. A method for transmitting, by a terminal, a Demodulation Reference Signal (DMRS) performed in a wireless communication system that supports a Narrow Band (NB)-Internet of Things (IoT), the method comprising:
   generating a DMRS sequence based on a number of subcarriers for transmission of the DMRS;
   receiving, from a base station (BS), DMRS density information for mapping the DMRS sequence to one or more symbols in a time domain;
   mapping the DMRS sequence to the one or more symbols based on the DMRS density information,
   wherein the DMRS density information is based on a coverage class, a frequency offset and a Doppler spread of the terminal;
   performing a phase ramp to the DMRS sequence; and
   transmitting, to the BS, the phase-ramped DMRS,
   wherein the subcarriers are subcarriers in a plurality of subframes,
   wherein, when the phase-ramped DMRS is transmitted on a single subcarrier, each element of the phase-ramped DMRS sequence is sequentially mapped to each symbol of multiple symbols configured for a single subcarrier transmission of the phase-ramped DMRS in the time domain, and
   wherein, when the phase-ramped DMRS is transmitted on multiple subcarriers:
      a length of the phase-ramped DMRS sequence equals a number of the multiple subcarriers; and
      the phase-ramped DMRS sequence is first mapped to an increasing order of the multiple symbols, and then is mapped to the multiple subcarriers.

2. The method of claim 1, wherein, when the number of the multiple subcarriers is 3, a length of the phase-ramped DMRS sequence is 3.

3. The method of claim 2, wherein a subcarrier spacing of the single subcarrier is 3.75 kHz or 15 kHz.

4. The method of claim 3, wherein each symbol of the multiple symbols configured for the single subcarrier transmission and each symbol of the multiple symbols configured for the multiple subcarrier transmission is a specific symbol in a time unit.

5. The method of claim 4, wherein the specific symbol is a fourth symbol in the time unit, when the subcarrier spacing of the single subcarrier transmission is 15 kHz.

6. The method of claim 5, wherein the phase-ramped DMRS is transmitted on a narrowband that has a bandwidth smaller than 200 kHz.

7. The method of claim 1, wherein the DMRS sequence is determined based on a cell-ID.

8. The method of claim 1, wherein an orthogonal cover code or a non-orthogonal cover code is applied to the phase-ramped DMRS sequence, when the phase-ramped DMRS is transmitted on the single subcarrier.

9. The method of claim 1, wherein a frequency hopping that has a hopping interval based on a cell-ID is applied, when the phase-ramped DMRS is transmitted on the single subcarrier.

10. The method of claim 4, wherein the time unit is a slot.

11. A terminal transmitting a Demodulation Reference Signal (DMRS) in a wireless communication system that supports a Narrow Band (NB)-Internet of Things (IoT), comprising:
   a radio frequency (RF) unit for transmitting and receiving a radio signal; and
   a processor for controlling the RF unit,
   wherein the processor is configured to:
      generate a DMRS sequence based on a number of subcarriers for transmission of the DMRS;
      receive, from a base station (BS), DMRS density information for mapping the DMRS sequence to one or more symbols in a time domain;
      map the DMRS sequence to the one or more symbols based on the DMRS density information,
      wherein the DMRS density information is based on a coverage class, a frequency offset and a Doppler spread of the terminal;
      perform a phase ramp to the DMRS sequence; and
      transmit, to the BS, the phase-ramped DMRS,
      wherein, the subcarriers are subcarriers in a plurality of subframes,
      wherein, when the phase-ramped DMRS is transmitted on a single subcarrier, each element of the phase-ramped DMRS sequence is sequentially mapped to each symbol of multiple symbols configured for a single subcarrier transmission of the phase-ramped DMRS in the time domain, and
      wherein, when the phase-ramped DMRS is transmitted on multiple subcarriers:
         a length of the phase-ramped DMRS sequence equals a number of the multiple subcarriers; and
         the phase-ramped DMRS sequence is first mapped to an increasing order of the multiple symbols, and then the multiple subcarriers.

* * * * *